(12) United States Patent
Liu et al.

(10) Patent No.: US 8,673,067 B2
(45) Date of Patent: Mar. 18, 2014

(54) IMMOBILIZED FLUID MEMBRANES FOR GAS SEPARATION

(75) Inventors: Wei Liu, Richland, WA (US); Nathan L. Canfield, Richland, WA (US); Jian Zhang, Richland, WA (US); Xiaohong Shari Li, Richland, WA (US); Jiguang Zhang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 969 days.

(21) Appl. No.: 12/470,294

(22) Filed: May 21, 2009

(65) Prior Publication Data

US 2010/0297531 A1    Nov. 25, 2010

(51) Int. Cl.
*B01D 53/00* (2006.01)
*B01D 53/22* (2006.01)

(52) U.S. Cl.
USPC .............................. 96/5; 95/43; 95/44; 96/4

(58) Field of Classification Search
USPC ......... 96/5; 423/210, 219, 700; 429/400, 403, 429/410, 414, 498; 502/4
See application file for complete search history.

(56) References Cited

U.S. PATENT DOCUMENTS

| | | |
|---|---|---|
| 2,437,422 A | 3/1948 | Dunham |
| 4,132,837 A | 1/1979 | Soffer |
| 4,525,704 A | 6/1985 | Campbell et al. |
| 4,781,889 A * | 11/1988 | Fukasawa et al. .............. 422/48 |
| 4,799,936 A | 1/1989 | Riley |
| 4,895,774 A | 1/1990 | Ohzu et al. |
| 5,019,263 A | 5/1991 | Haag et al. |
| 5,110,694 A | 5/1992 | Nagasubramanian et al. |
| 5,130,211 A | 7/1992 | Wilkinson et al. |
| 5,194,158 A * | 3/1993 | Matson .............................. 95/46 |
| 5,206,095 A | 4/1993 | Donado et al. |
| 5,296,318 A | 3/1994 | Gozdz et al. |
| 5,510,209 A | 4/1996 | Abraham et al. |
| 5,698,339 A | 12/1997 | Kawakami et al. |

(Continued)

FOREIGN PATENT DOCUMENTS

| | | |
|---|---|---|
| JP | 63-105469 | 5/1988 |
| JP | 2001-120940 | 5/2001 |

(Continued)

OTHER PUBLICATIONS

Wei et al., "Influence of electrode structure on the performance of a direct methanol fuel cell," 2002, Journal of Power Sources, 106, pp. 364-369.*

(Continued)

*Primary Examiner* — Melvin C Mayes
*Assistant Examiner* — Colin W Slifka
(74) *Attorney, Agent, or Firm* — Klarquist Sparkman, LLP

(57) ABSTRACT

Provided herein are immobilized liquid membranes for gas separation, methods of preparing such membranes and uses thereof. In one example, the immobilized membrane includes a porous metallic host matrix and an immobilized liquid fluid (such as a silicone oil) that is immobilized within one or more pores included within the porous metallic host matrix. The immobilized liquid membrane is capable of selective permeation of one type of molecule (such as oxygen) over another type of molecule (such as water). In some examples, the selective membrane is incorporated into a device to supply oxygen from ambient air to the device for electrochemical reactions, and at the same time, to block water penetration and electrolyte loss from the device.

39 Claims, 19 Drawing Sheets

(56) References Cited

U.S. PATENT DOCUMENTS

| | | | |
|---|---|---|---|
| 5,716,527 A * | 2/1998 | Deckman et al. | 210/651 |
| 5,985,475 A | 11/1999 | Reynolds et al. | |
| 6,326,326 B1 | 12/2001 | Feng et al. | |
| 6,368,751 B1 | 4/2002 | Yao et al. | |
| 6,464,742 B1 | 10/2002 | Leung et al. | |
| 6,846,554 B2 | 1/2005 | Fryxell et al. | |
| 6,929,705 B2 | 8/2005 | Myers et al. | |
| 6,946,015 B2 | 9/2005 | Jorgensen et al. | |
| 7,014,948 B2 | 3/2006 | Lee et al. | |
| 7,396,797 B2 | 7/2008 | Tsutsumi et al. | |
| 7,740,965 B2 | 6/2010 | Richards et al. | |
| 2001/0006158 A1 | 7/2001 | Ho et al. | |
| 2002/0050054 A1 | 5/2002 | Noh | |
| 2002/0132158 A1 | 9/2002 | Sassen | |
| 2004/0149127 A1* | 8/2004 | Lyons et al. | 95/45 |
| 2004/0247996 A1 | 12/2004 | Smith et al. | |
| 2005/0003957 A1* | 1/2005 | Vaughn et al. | 502/214 |
| 2006/0286456 A1 | 12/2006 | Fu et al. | |
| 2007/0141473 A1 | 6/2007 | Yang et al. | |
| 2007/0160898 A1 | 7/2007 | Takamura et al. | |
| 2008/0038641 A1 | 2/2008 | Visco et al. | |
| 2008/0102358 A1 | 5/2008 | Kowalczyk et al. | |
| 2008/0115667 A1 | 5/2008 | Lee et al. | |
| 2008/0210087 A1 | 9/2008 | Ku et al. | |
| 2008/0268327 A1 | 10/2008 | Gordon et al. | |
| 2009/0053594 A1 | 2/2009 | Johnson et al. | |
| 2009/0053607 A1 | 2/2009 | Jeong et al. | |
| 2009/0061288 A1 | 3/2009 | Gordon et al. | |
| 2009/0114594 A1 | 5/2009 | Sirkar | |
| 2010/0190043 A1 | 7/2010 | Nakanishi | |
| 2011/0052466 A1 | 3/2011 | Liu | |
| 2011/0059355 A1 | 3/2011 | Zhang et al. | |
| 2011/0059364 A1 | 3/2011 | Zhang et al. | |
| 2011/0114254 A1 | 5/2011 | Xu et al. | |
| 2012/0180945 A1 | 7/2012 | Zhang et al. | |

FOREIGN PATENT DOCUMENTS

| | | |
|---|---|---|
| JP | 2008-036463 | 2/2008 |
| WO | WO00/53297 | 9/2000 |
| WO | WO2006/049940 | 5/2006 |
| WO | WO2006/050531 | 5/2006 |
| WO | WO2009/005745 | 1/2009 |
| WO | WO2009/013629 | 1/2009 |

OTHER PUBLICATIONS

Written Opinion of the International Searching Authority, dated Dec. 6, 2010, for Application No. PCT/US2010/035543.
International Search Report of the International Searching Authority, dated Dec. 6, 2010, for Application No. PCT/US2010/035543.
International Search Report and Written Opinion for PCT/US2010/041213 (Mailed Feb. 8, 2011).
International Search Report and Written Opinion for PCT/US2010/041214 (Mailed Feb. 8, 2011).
International Search Report and Written Opinion for PCT/US2010/052170 (Mailed Jan. 28, 2011).
Bao, L. et al., "Facilitated transport of $CO_2$ across a liquid membrane: Comparing enzyme, amine, and alkaline," *Journal of Membrane Science*, vol. 280, pp. 330-334 (Mar. 2, 2006).
Bara, J. et al., "Guide to $CO_2$ Separations in Imidazolium-Based Room-Temperature Ionic Liquids," *Ind. Eng. Chem. Res.*, vol. 48, No. 6, pp. 2739-2751 (Feb. 11, 2009).
Camper, D. et al., "Bulk-fluid solubility and membrane feasibility of Rmim-based room-temperature ionic liquids," *Ind. Eng. Che. Res.*, vol. 45, pp. 6279-6283 (Aug. 8, 2006).
Chen, H. et al., "Immobilized glycerol-based liquid membranes in hollow fibers for selective $CO_2$ separation from $CO_2$—$N_2$ mixtures," *Journal of Membrane Science*, vol. 183, No. 1, pp. 75-88 (Feb. 28, 2001).
Deng, L. et al., "Facilitated transport of $CO_2$ in novel PVAm/PVA blend membrane," *J. Mem. Sci.*, vol. 340, pp. 154-163 (May 23, 2009).

Dong, J. et al., "Multicomponent Hydrogen/Hydrocarbon Separation by MFI-Type Zeolite Membranes," *AIChE Journal*, vol. 46, No. 10, pp. 1957-1966 (Oct. 2000).
El-Azzami, L.A. et al., "Parametric Study of $CO_2$ Fixed Carrier Facilitated Transport through Swollen Chitosan Membranes," *Ind.& Eng. Chem. Res.*, vol. 48, No. 2, pp. 894-902 (Jan. 21, 2009).
Favre, E., "Carbon dioxide recovery from post-combustion processes: Can gas permeation membranes compete with absorption," *Journal of Membrane Science*, vol. 294, Nos. 1-2), pp. 50-59 (Feb. 9, 2007).
Gu, X. et al., "Synthesis of Defects-Free FAU-Type Zeolite Membranes and Separation for Dry and Moist $CO_2/N_2$ Mixtures," *Ind. Eng. Chem. Res.*, vol. 44, No.4, pp. 937-944 (Feb. 16, 2005).
Gu, Y. et al., "Ionic liquids-based catalysis with solids: state of the art," *Adv. Synth. Catal.*, vol. 351, pp. 817-847 (Apr. 6, 2009).
Hanioka, S. et al, "$CO_2$ separation facilitated by task-specific ionic liquids using a supported liquid membrane," *Journal of Membrane Science*, vol. 314, pp. 1-4 (Jan. 24, 2008).
Harlick, P.J.E. et al., "Applications of Pore-Expanded Mesoporous Silicas. 3. Triamine Silane Grafting for Enhanced $CO_2$ Adsorption," *Ind. Eng. Chem. Res.*, vol. 45, pp. 3248-3255 (Mar. 22, 2006).
Harlick, P.J.E. et al., "Applications of Pore-Expanded Mesoporous Silica. 5. Triamine Grafted Material with Exceptional $CO_2$ Dynamic and Equilibrium Adsorption Performance," *Ind. Eng. Chem. Res.*, vol. 46, pp. 446-458 (Jan. 17, 2007).
Harris, F. et al., "Solubilities of Carbon Dioxide and Densities off Aqueous Sodium Glycinate Solutions before and after $CO_2$ Absorption," *J. Chem. Eng. Data*, vol. 54, pp. 144-147 (Jan. 8, 2009).
Huang, J. et al., "Carbon Dioxide Capture Using a $CO_2$-Selective Facilitated Transport Membrane," *Ind. Eng. Chem. Res.*, vol. 47, No. 4, pp. 1261-1267 (Jan. 16, 2008).
Hwang, K. et al., "Reaction kinetics between carbon dioxide and glycidyl methacrylate using trihexylamine immobilized ionic liquid on MCM41 catalyst," *J. Ind. and Eng. Chem.*, vol. 15, pp. 854-859 (Nov. 25, 2009).
Ilconich, J. et al., "Experimental investigation of the permeability and selectivity of supported ionic liquid membranes for $CO_2$/He separation at temperatures up to 125° C.," *Journal of Membrane Science*, vol. 298, pp. 41-47 (Apr. 6, 2007).
Kai, T. et al., "Development of cesium-incorporated carbon membranes for $CO_2$ separation under humid conditions," *Journal of Membrane Science*, vol. 342, pp. 14-21 (Jun. 17, 2009).
Koros, W. et al., "Pushing the limits on possibilities for large scale gas separation: which strategies?," *Journal of Membrane Science*, vol. 175, No. 2, pp. 181-196 (Aug. 10, 2000).
Koros, W. et al., "Pushing the limits on possibilities for large scale gas separation: which strategies?," *Journal of Membrane Science*, vol. 181, p. 141 (Jan. 15, 2001).
Li, L. et al., "Stabilization of Metal Nanoparticles in Cubic Mesostructured Silica and Its Application in Regenerable Deep Desulfurization of Warm Syngas," *Chem. Mater.*, vol. 21, pp. 5358-5364 (Oct. 22, 2009).
Li, Y. et al., "Pervaporation and vapor permeation dehydration of Fischer-Tropsch mixed-alcohols by LTA zeolite membranes," *Separation and Purification Technology*, vol. 57, p. 140-146 (Oct. 1, 2007).
Lin, H. et al., "Materials selection guidelines for membranes that remove $CO_2$ from gas mixtures," *Journal of Molecular Structure*, vol. 739, pp. 57-74 (Apr. 2005).
Liu, W. et al., "Critical Material and Process Issues for $CO_2$ Separation from Coal-Powered Plants," *JOM*, vol. 41, No. 4, pp. 36-44 (Apr. 2009).
Luis, P. et al., "Facilitated transport of $CO_2$ and $SO_2$ through Supported Ionic Liquid Membranes (SILMs)," *Desalination*, vol. 245, pp. 485-493 (Sep. 15, 2009).
Masuda, T. et al., "Preparation of hydrophilic and acid-proof silicalite-1 zeolite membrane and its application to selective separation of water from water solutions of concentrated acetic acid by pervaporation," *Separation and Purification Technology*, vol. 32, p. 181-189 (Jul. 1, 2003).
Mineo, P.G. et al., "Very fast $CO_2$ response and hydrophobic properties of novel poly(ionic liquid)s," *J. of Materials Chem.*, vol. 19, No. 46, pp. 8861-8870 (Oct. 19, 2009).

(56) References Cited

OTHER PUBLICATIONS

Morigami, Y. et al., "The first large-scale pervaporation plant using tubular-type module with zeolite NaA membrane," *Separation and Purification Technology*, vol. 25, p. 251-260 (Oct. 1, 2001).

National Energy Technology Laboratory (NETL) "Carbon Dioxide Capture from Existing Coal-Fired Power Plants," DOE/NETL-401/110907, Final Report (Original Issue Date, Dec. 2006), Revision Date, Nov. 2007.

National Energy Technology Laboratory (NETL), "Cost and Performance Baseline for Fossil Energy Plants," DOE/NETL-2007/1281, vol. 1: Bituminous Coal and Natural Gas to Electricity, Final Report (Original Issue Date, May 2007), Revision 1, Aug. 2007.

Sandru, M. et al., "Composite hollow fiber membranes for $CO_2$ capture," *Journal of Membrane Science*, vol. 346, pp. 172-186 (Jan. 1, 2010).

Sebastian, V. et al., "Zeolite membrane for $CO_2$ removal: Operating at high pressure," *Journal of Membrane Science*, vol. 292, pp. 92-97 (Jan. 24, 2007).

Shekhawat, D. et al., "A Review of Carbon Dioxide Selective Membranes," *US DOE Topical Report*, DOE/NETL-2003/1200 (Dec. 1, 2003).

Tang, J. et al., "Enhanced $CO_2$ Absorption of Poly(ionic liquid)s," *Macromolecules*, vol. 38, pp. 2037-2039 (Feb. 18, 2005).

Tang, J. et al., "Low-temperature $CO_2$ sorption in ammonium-based poly(ionic liquid)s," *Polymer*, vol. 46, pp. 12460-12467 (Nov. 4, 2005).

Ward, W. et al, "Carbon Dioxide-Oxygen Separation: Facilitated Transport of Carbon Dioxide Across a Liquid Film," *Science*, vol. 156, pp. 1481-1484 (Jun. 16, 1967).

Xomeritakis, G. et al, "Tubular ceramic-supported sol-gel silica-based membranes for flue gas carbon dioxide capture and sequestration," *Journal of Membrane Science*, vol. 341, pp. 30-36 (May 23, 2009).

Yan, T.Y. et al., "Adsorption of $CO_2$ on the Rutile (110) Surface in Ionic Liquid. A Molecular Dynamics Simulation," *J. of Phys. Chem. C*, vol. 113, No. 45, pp. 19389-19392 (Oct. 19, 2009).

Yegani, R. et al., "Selective separation of $CO_2$ by using novel facilitated transport membrane at elevated temperatures and pressures," *Journal of Membrane Science*, vol. 291, pp. 157-164 (Jan. 18, 2007).

Yokozeki, A. et al., "Hydrogen purification using room-temperature ionic liquids," *Applied Energy*, vol. 84, pp. 351-361 (Mar. 2007).

Yu, G. et al., "Design of task-specific ionic liquids for capturing $CO_2$: A molecular orbital study," *Ind. Eng. Chem. Res*, vol. 45, No. 8, pp. 2875-2880 (Feb. 24, 2006).

Yu, G.R. et al., "Structure, Interaction and Property of Amino-Functionalized Imidazolium ILs by Molecular Dynamics Simulation and Ab Initio Calculation," *AIChE J.*, vol. 53, No. 12, pp. 3210-3221 (Dec. 2007).m.

Zhang, J. et al., "Supported Absorption of $CO_2$ by Tetrabutylphosphonium Amino Acid Ionic Liquids," *Chem. Eur. Journal*, vol. 12, pp. 4021-4026 (May 15, 2006).

Zhang, S. et al., "Fixation and conversion of $CO_2$ using ionic liquids," *Catalysis Today*, vol. 115, pp. 61-69 (Mar. 29, 2006).

Zhang, Y. et al., "Dual Amino-Functionalised Phosphonium Ionic Liquids for $CO_2$ Capture," *Chem. Eur. J.*, vol. 15, pp. 3003-3011 (Mar. 9, 2009).

Zheng, F. et al., "Ethylenediamine-Modified SBA-15 as Regenerable $CO_2$ Sorbent," *Ind. & Eng. Chem. Res.*, vol. 44, pp. 3099-3105 (Mar. 25, 2005).

Zou, J. et al., "$CO_2$-selective polymeric membranes containing amines in crosslinked poly(vinyl alcohol)," *Journal of Membrane Science*, vol. 286, pp. 310-321 (Oct. 10, 2006).

International Search Report and Written Opinion for PCT/US2011/031342 (Mailed Jul. 27, 2011).

PCT Application No. PCT/US2011/031342, filed Apr. 6, 2011, 42 pages.

Barras, "Breathing batteries could store 10 times the energy," *NewScientist*, 2 pages (May 19, 2009).

Dobley et al., "Non-aqueous Lithium-Air Batteries with an Advanced Cathode Structure," 4 pages (publication believed to be Dec. 7, 2004).

Dobley et al., "Lithium-Air Cells and Systems," *Proceedings of the 43rd Power Sources Conference*, pp. 23-25, Philadelphia, PA, (Jul. 7-10, 2008).

Foster et al., "Chelating Agents as Electrolyte Additives for Lithium-Ion Batteries," Army Research Laboratory, 18 pages, Mar. 1999.

Kowalczk et al., "Li-air batteries: A classic example of limitations owing to solubilities," *Pure Appl. Chem.*, vol. 79, No. 5, pp. 851-860 (2007).

Read, "Characterization of the Lithium/Oxygen Organic Electrolyte," *Journal of the Electrochemical Society*, vol. 149, No. 9, pp. A1190-A1195 (2002).

Read, "Ether-Based Electrolytes for the Lithium/Oxygen Organic Electrolyte Battery," *Journal of the Electrochemical Society*, vol. 153, No. 1, pp. A96-A100 (2006).

Shin et al., "Three-Dimensional Porous Copper-Tin Alloy Electrodes for Rechargeable Lithium Batteries," *Adv. Funct. Mater.*, vol. 15, No. 4, pp. 582-586, Apr. 2005.

Final Office action from U.S. Patent and Trademark Office for U.S. Appl. No. 12/621,410, mailed Jul. 6, 2012.

Office action from U.S. Patent and Trademark Office for U.S. Appl. No. 13/414,641, mailed Jul. 16, 2012.

Restriction Requirement from U.S. Patent and Trademark Office for U.S. Appl. No. 12/557,452, mailed Aug. 10, 2012.

Final Office action from U.S. Patent and Trademark Office for U.S. Appl. No. 12/557,455, mailed Nov. 8, 2012.

Office action from U.S. Patent and Trademark Office for U.S. Appl. No. 12/557,452, mailed Dec. 6, 2012.

\* cited by examiner

FIG. 2A PRIOR ART
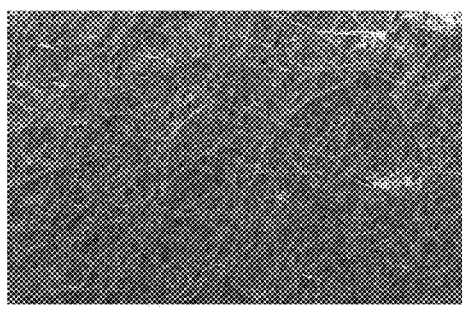
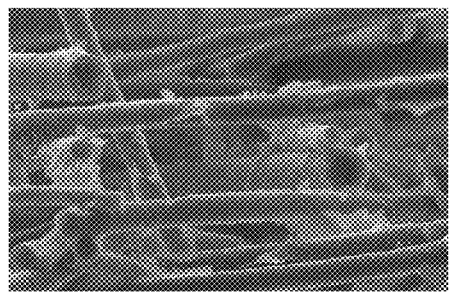
FIG. 2B PRIOR ART
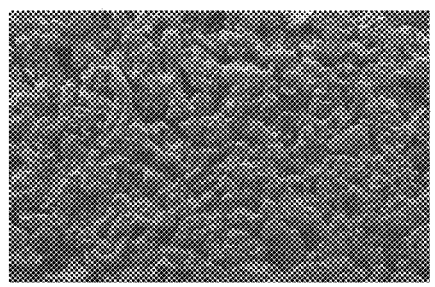
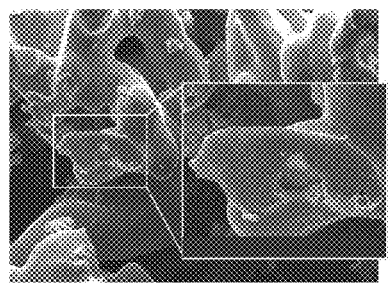

FIG. 3C FIG. 3D

◫ φ1mm holes distributed around 5 5 cm on 8 8 cm hard plastic plate (3 mm)

FIG. 6A
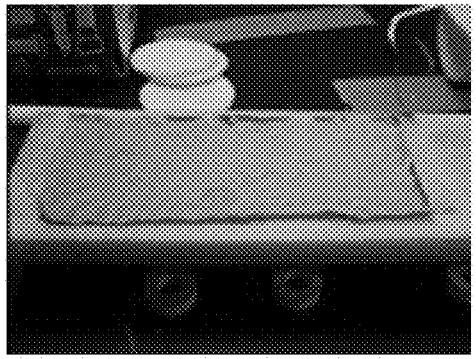
FIG. 6B
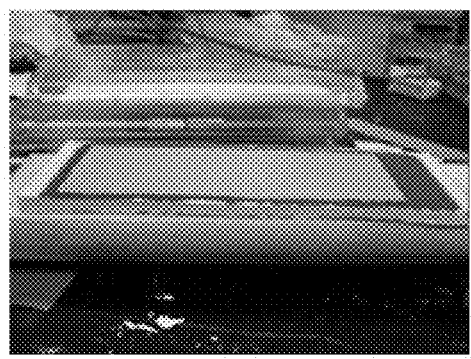
FIG. 6C(1)
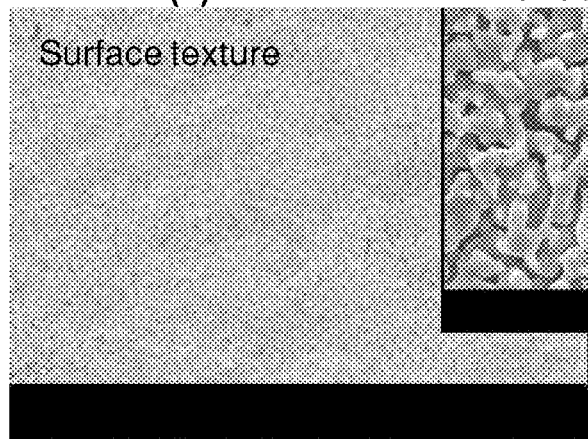
FIG. 6C(2)
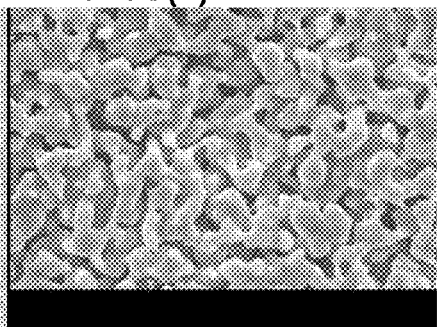
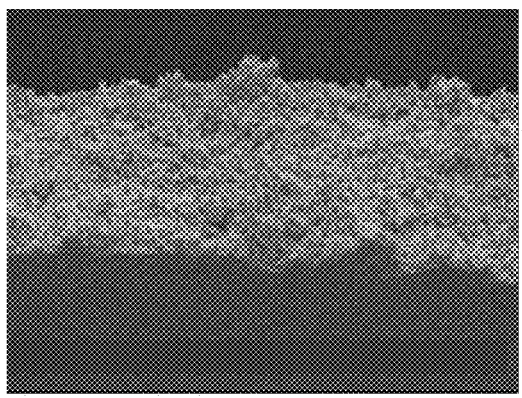
FIG. 6C(3)

FIG. 13A    FIG. 13B
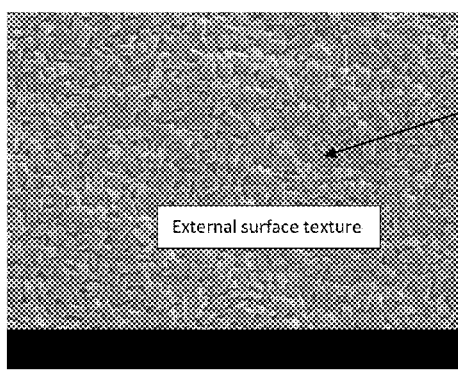 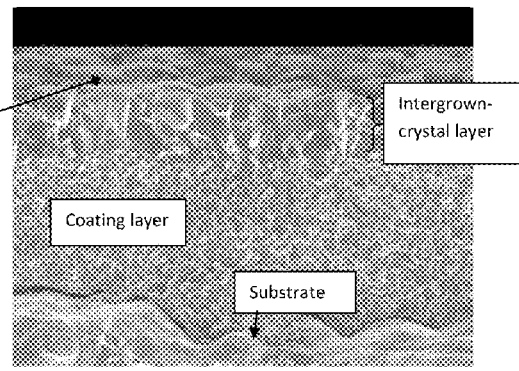

IMMOBILIZED FLUID MEMBRANES FOR GAS SEPARATION

ACKNOWLEDGMENT OF GOVERNMENT SUPPORT

This invention was made with government support under DE-AC0576RL01830 awarded by The Department of Energy. The government has certain rights in the invention.

FIELD

The present disclosure relates to membranes, specifically to membranes, materials and methods of making and using the same for selective gas separation.

BACKGROUND

Electrochemical devices, such as batteries and fuel cells, typically incorporate an electrolyte source to provide the anions or cations necessary to produce an electrochemical reaction. Batteries and fuel cells operate on electrochemical reaction of metal/air, metal/halide, metal/hydride, hydrogen/air, or other materials capable of electrochemical reaction. A lithium (Li)/air system, for example, requires the diffusion of oxygen gas in the cathode, and typically will incorporate an organic solution as the electrolyte. The lifetime of this battery is however, limited for several reasons. First, the naked Li anode is corroded by both the moisture that is entrained into the cathode with oxygen from ambient air and leaked through the separator. Second, the oxygen and Li(+1) ion paths of the cathode gradually become blocked due to reaction of the Li(+1) with the moisture impurity. Third, the electrolyte solution becomes lost into the ambient air due to vaporization. In addition to the Li/air systems, other metal/air systems, such as aluminum/air, Zn/air, cadmium/air, magnesium/air, and iron/air systems, also have the potential for many different applications due to their theoretically high ampere-hour capacity, voltage, and specific energy, but these systems are also plagued by corrosion of the anode caused by the moisture coming from ambient air Conventional membranes are often comprised, in part, of polymeric or ceramic materials. Such conventional membranes have many associated deficiencies such as low selectivity and/or relatively high cost.

Immobilized liquid membranes (ILMs) contain a liquid solution immobilized in the pores of a matrix, by physical forces. The liquid solution includes a carrier that absorbs/desorbs reversibly with the gas species of interest. ILMs can potentially provide the highest fluxes and selectivities for reacting species such as oxygen. However, commercialization of these membranes as selective barriers in electrochemical devices has not taken place due to the limitation of stability of conventional liquid membranes.

Multiple factors contribute to the instability of available ILMs. First, instability is caused by the absence of any chemical bonding of the carrier to the matrix. Evaporation of the carrier and/or the liquid solution into gas phases during the operation also contributes to ILM instability. Moreover, instability is caused by lower breakthrough pressures associated with the liquids and the inability of the membranes to withstand even temporary oscillations in humidity conditions on either side of the liquid membranes.

SUMMARY

New membrane designs and methods of preparation of such membranes for selective transport of one type of molecule over another are disclosed. Embodiments of the membranes provide for the immobilization of a liquid-fluidic phase of selective absorption functions in a porous inorganic support membrane. Embodiments of the disclosed membranes can be manufactured on a commercial scale at relatively low cost and offer superior mechanical and chemical durability. Also disclosed are methods for gas separation and selective permeation by selective barrier in battery and fuel cell environments.

Particular embodiments of the disclosed membranes and methods provide selective permeation of oxygen over moisture or air/water vapor separation. Embodiments of the membranes may include particular liquid fluids that are stable and operable under separation conditions of from −50° C. to 300° C. Embodiments of the membranes may also include fabricated porous metal matrices that have, for example, a thickness of less than 100 μm and pores with a modified surface chemistry and size (e.g., less than 10 μm) to enhance the adhesion of the liquid fluid, such as a silicone oil. The modified pore structure allows the oil to remain in the membrane during use. Embodiments of the membrane have an $O_2$ permeance of about a few orders of magnitude (e.g., 3 orders of magnitude) higher than those reported in the prior art. Further, use of such membrane in a lithium/air battery enables the battery to operate more for than two weeks in ambient air (for example, at 30% relative humidity), much longer than batteries including prior art or conventional membranes (e.g., greater than 400 hours of operation as compared to 76 hours of operation with a commercially available laminated PTFE membrane).

In one embodiment, a selective membrane is disclosed that includes an immobilized liquid membrane comprising a porous metallic host matrix having a plurality of pores and an immobilized liquid fluid comprising a silicone oil, the immobilized liquid fluid being within the pores of the metallic host matrix. The immobilized liquid membrane is capable of selective permeation of a first type of molecule over a second type of molecule. In some examples, the first type of molecule is oxygen and the second type of molecule is water. In one example, the pores of the metallic host matrix have an average pore size of less than 2 microns. In an example, the porous metallic host matrix has a porosity of 25% to 75%. In certain examples, the porous metallic host matrix has a thickness of less than 200 microns, less than 100 microns, less than 50 microns. In one particular example, the porous metallic host matrix has a thickness of 30 microns.

In some examples, the selective membrane is capable of an $O_2$ permeance of greater than $10^{-10}$ mol/m$^2$/s/Pa. In an example, the immobilized liquid fluid comprises a silicone oil having a boiling point of greater than 100° C. Exemplary porous metallic host matrices comprise nickel, a nickel alloy, steel, stainless steel, titanium, aluminum, aluminum alloy or a combination thereof. In one particular example, the porous metallic host matrix comprises nickel. In one example, the immobilized liquid fluid in the pore comprises a solid state coating of silicone oil that is less than 10 microns thick.

In certain examples, the selective membrane further comprises a thin film of material having a thickness of less than 10 microns, the thin film formed on the porous metallic host matrix and being capable of enhancing adhesion of the immobilized liquid fluid to the porous metallic host matrix. For example, the thin film comprises polytetrafluoroethylene, polydimethylsiloxane or mixtures thereof.

In another embodiment, a selective membrane is disclosed that comprises an immobilized liquid membrane comprising a porous metallic host matrix having a plurality of pores, the pores having openings of less than or equal to 2 μm and an immobilized liquid fluid within the pores of the porous metallic host matrix. The immobilized liquid membrane is capable of selective permeation of a first type of molecule over a second type of molecule. In some examples, the immobilized liquid fluid comprises a silicone oil. In some examples, the first type of molecule is oxygen and the second type of molecule is water. In one example, the pores of the metallic host matrix have an average pore size of less than 2 microns. In an example, the porous metallic host matrix has a porosity of 25% to 75%. In certain examples, the porous metallic host matrix has a thickness of less than 200 microns, less than 100 microns, less than 50 microns. In one particular example, the porous metallic host matrix has a thickness of 30 microns.

In some examples, the selective membrane is capable of an $O_2$ permeance of greater than $10^{-10}$ mol/m²/s/Pa. In an example, the immobilized liquid fluid comprises a silicone oil having a boiling point of greater than 100° C. Exemplary porous metallic host matrices comprise nickel, a nickel alloy, steel, stainless steel, titanium, aluminum, aluminum alloy or a combination thereof. In one particular example, the porous metallic host matrix comprises nickel. In one example, the immobilized liquid fluid in the pore comprises a solid state coating of silicone oil that is less than 10 microns thick.

In certain examples, the selective membrane further comprises a thin film of material having a thickness of less than 10 microns, the thin film formed on the porous metallic host matrix and being capable of enhancing adhesion of the immobilized liquid fluid to the porous metallic host matrix. For example, the thin film comprises polytetrafluoroethylene, polydimethylsiloxane or mixtures thereof.

In other embodiments, a selective membrane is disclosed that comprises an immobilized liquid membrane comprising a porous metallic host matrix having a thickness of less than or equal to 200 microns, a porosity of 25% to 75%, and a plurality of pores, the pores having openings of less than or equal to 2 microns and an immobilized liquid fluid within the pores of the porous metallic host matrix. The immobilized liquid membrane is capable of selective permeation of a first type of molecule over a second type of molecule. In some examples, the porous metallic host matrix comprises nickel. In an example, the immobilized liquid fluid comprises a silicone oil. In an example, the selective membrane further comprises a thin film of material less than or equal to 10 microns thick, the thin film formed on the porous metallic host matrix and capable of enhancing adhesion of the immobilized liquid fluid to the porous metallic host matrix. For example, the thin film comprises polytetrafluoroethylene, polydimethylsiloxane or mixtures thereof. In a particular example, the porous metallic host matrix comprises greater than 90% pores each pore having a size of less than 2 microns, has a thickness of less than 200 microns, wherein the matrix is capable of providing support or substrate structure to a host gas separation membrane or to a host catalytic coating. In an example, the immobilized liquid membrane is for separation of oxygen from water and the silicone oil is incorporated onto an exterior surface of the porous metallic host matrix as a thin film of a thickness of less than 10 microns.

In additional embodiments, a device is disclosed that comprises a cathode and an immobilized liquid membrane coupled to the cathode, wherein the immobilized liquid membrane comprises a porous metallic host matrix with a pore size of less than 10 microns and immobilized silicon oil. In such embodiments, the membrane forms a selective cathode barrier in the device and is capable of increasing the durability of the device by at least 50% as compared to the durability of the device without the immobilized liquid membrane. In some examples, the first type of molecule is oxygen and the second type of molecule is water. In an example, the porous metallic host matrix of the device has a porosity of 25% to 75%.

In other embodiments, a selective membrane is disclosed that comprises an immobilized liquid membrane comprising a porous, self-supported polymeric host matrix having a plurality of pores, the porous, self-supported PTFE host matrix having average pore size of less than or equal to 2 µm and a porosity of from 25 to 75% and an immobilized liquid fluid comprising silicon oil, the immobilized liquid fluid formed on or in the porous, self-supported polymeric host matrix. The immobilized liquid membrane is capable of selective permeation of a first type of molecule oxygen over a second type of molecule water. In an example, the polymeric host matrix comprises a polyflurohydrocarbon, such as PTFE.

In an additional embodiment, as method of making a selective membrane is disclosed that comprises making a porous metallic matrix using a tape casting process comprising: (i) preparing a slurry of a metal precursor material; (ii) casting the slurry into a green body of the porous metallic matrix; (iii) firing of the green body of the porous metallic matrix to remove organic compounds therefrom and sintering the metal precursor material; and (iv) reducing the fired green body into metallic state.

In a further embodiment, a selective membrane is disclosed that comprises a porous metallic host matrix having an average pore size of less than or equal to 2 µm, a porosity of from 25 to 75%, a thickness of less than or equal to 200 µm, and having an exterior surface and an immobilized layer of a selective membrane material on the exterior surface of the porous metallic host matrix, the immobilized layer having a thickness of less than or equal to 10 µm. In this embodiment, the immobilized layer of selective membrane material is capable of selective permeation of a first type of molecule over a second type of molecule. In an example, the selective membrane material comprises polyflurohydrocarbon and wherein the first type of molecule is oxygen and the second type of molecule is water. In one example, the selective membrane material comprises PTFE and wherein the first type of molecule is oxygen and the second type of molecule is water. In other examples, the selective membrane material comprises zeolite.

In even further embodiments, methods comprising oxygen permeation in a battery device by use of any of the disclosed selective membranes are provided.

The foregoing features of the disclosure will become more apparent from the following detailed description, which proceeds with reference to the accompanying figures.

BRIEF DESCRIPTION OF THE DRAWINGS

FIGS. 2A and 2B are SEM micrographs illustrating the pore structures of prior art porous inorganic sheets for ceramic fiber porous sheet and Ti porous sheet, respectively.

FIGS. 6A and 6B are digital images illustrating two different embodiments of the disclosed porous metallic matrix.

FIGS. 6C(1), 6C(2), and 6C(3) are SEM micrographs illustrating pore structures of another embodiment of the disclosed porous metallic matrix sheet.

FIG. 7A is a SEM micrograph illustrating micro-structures of single layer of PTFE coating on a nickel matrix treated at 130° C. for 30 minutes. FIG. 7B is a SEM micrograph illustrating micro-structures of single layer of PTFE coating on a nickel matrix treated at 300° C. for 30 minutes in ambient air. FIG. 7C is a SEM micrograph illustrating micro-structures of two layers of PTFE coating on a nickel matrix treated at 320° C. for 30 minutes. FIG. 7D is a SEM micrograph illustrating micro-structures of two layers of PTFE coating on a nickel matrix treated at 360° C. for 30 minutes in nitrogen.

FIG. 13 is a pair of SEM images illustrating the texture of silicalite membrane grown on an embodiment of the disclosed nickel matrix.

DETAILED DESCRIPTION

I. Terms

Figure 1A:
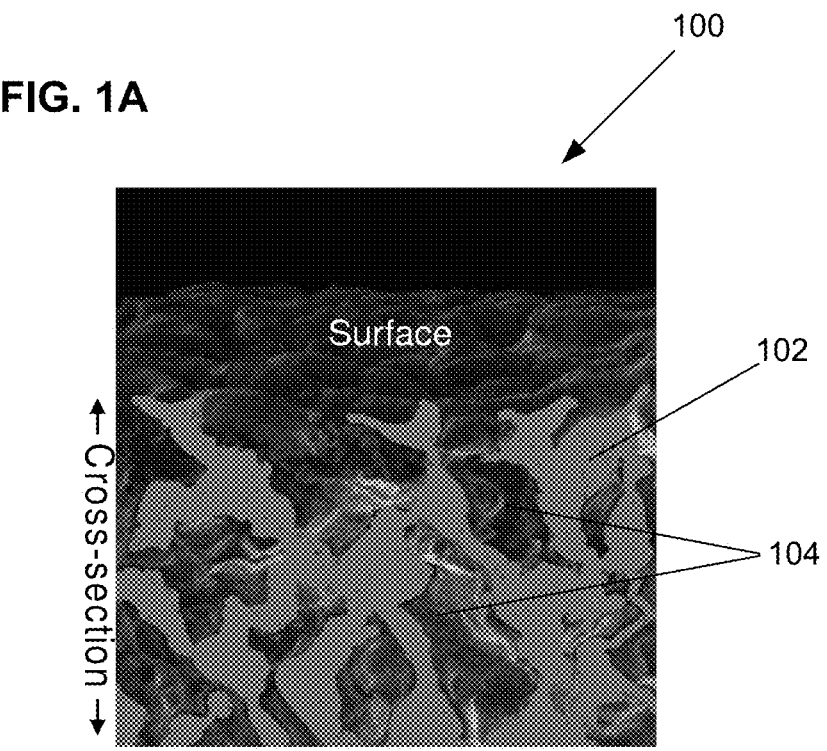
FIG. 1A is a schematic illustrating an exemplary immobilized liquid membrane.

Unless otherwise noted, technical terms are used according to conventional usage. Further, unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. It is further to be understood that all base sizes or amino acid sizes, and all molecular weight or molecular mass values, given for nucleic acids or polypeptides are approximate, and are provided for description. Although methods and materials similar or equivalent to those described herein can be used in the practice or testing of this disclosure, suitable methods and materials are described below. The term "comprises" means "includes." The abbreviation, "e.g." is derived from the Latin exempli gratia, and is used herein to indicate a non-limiting example. Thus, the abbreviation "e.g." is synonymous with the term "for example."

Unless otherwise indicated, all numbers expressing quantities of ingredients, properties such as molecular weight, percentages, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

All publications, patent applications, patents, and other references mentioned herein are incorporated by reference in their entireties. In case of conflict, the present specification, including explanations of terms, will control. In addition, all the materials, methods, and examples are illustrative and not intended to be limiting. In order to facilitate review of the various embodiments of the disclosure, the following explanations of specific terms are provided:

Absorption: A physical or chemical phenomenon or a process in which molecules in a gas phase are taken up into the bulk of a fluid of other matter, such as liquid fluid or solid-state fluid. Absorption is a different process from adsorption, since the molecules are taken up in the bulk of other matter, not by the surface of other matter. A more general term is sorption, which covers adsorption, absorption, and ion exchange.

Cathode: An electrode through which electric charge flows out of a polarized electrical device. From an electrochemical point of view, positively charged cations invariably move toward the cathode and/or negatively charged anions move away from it to balance the electrons arriving from external circuitry. Cathode polarity is not always negative however. Cathode polarity depends on the device type, and can even vary according to the operating mode. In a discharging battery or galvanic cell the cathode is the positive terminal, toward the direction of conventional current. This outward charge is carried internally by positive ions moving from the electrolyte to the positive cathode. In a recharging battery, or an electrolytic cell, the cathode is the negative terminal, which sends charge back to the external generator.

Cathode Barrier: A material or substance that significantly reduces or inhibits degradation of a cathode, anode or other components in a battery or cell, such as degradation caused by reaction with moisture or carbon dioxide. In one example, a cathode barrier reduces or inhibits degradation of a cathode by reducing or inhibiting the ingress of the substance causing the degradation, such as reducing or inhibiting the ingress of water. In certain examples of the presently disclosed invention, a cathode barrier comprises an embodiment of the disclosed immobilized liquid membrane including a selective liquid fluid such as silicone oil hosted in a porous host matrix such as an embodiment of the porous nickel host matrix and porous PTFE matrix.

Host Matrix: The host matrix is a porous matter that provides networked pore structures for occupancy by a liquid fluid. The liquid fluid may be captured and preserved by the host matrix, and the liquid fluid is connected (that is, the fluid is not isolated pockets). The host matrix defines the physical shape of the immobilized liquid membrane and provides the mechanical integrity. Thus, the host material is of a durable material and of a material that is not degraded when filled with the liquid fluid. In one example of the disclosed invention, a host matrix comprises a porous metallic host matrix, including a porous nickel matrix.

Hydrocarbon Fluid: A fluid (such as a liquid) having a carbon "backbone" or skeleton, other bonded compounds, and a functional group that makes the fluid repel water or moisture. Examples of such a hydrocarbon fluid are silicone oil, hydrocarbon oil such as wax, and fluorohydrocarbon.

Immobilized Liquid Fluid: A liquid fluid that is bound to a surface of solid matter, such as bound to the surface of a pore of a host matrix. The liquid can be bound onto the solid surface by chemical bonding formation between the host matter and the liquid, van der walls force, and/or capillary force, depending upon the thickness of the liquid to be immobilized. In one example, an immobilized liquid fluid is a hydrocarbon fluid, such as a silicone oil, including, but not limited to polydimethylsiloxane.

Immobilized Liquid Membrane (ILM): A membrane that contains a liquid solution immobilized in the pores of the host matrix by physical and/or chemical forces. In one example, an immobilized liquid membrane is a membrane that contains oil immobilized in the pores of a metallic host matrix (e.g., an embodiment of the disclosed nickel host matrix).

Liquid Fluid: A fluid that has the particles loose and can freely form a distinct surface at the boundaries of its bulk material. Examples of liquids include water and oil.

Membrane support: The membrane support is a structure having a surface for deposition or coating of a selective membrane. The membrane support is permeable so that a molecule separated by the membrane can readily permeate through the membrane support. The membrane support provides mechanical integrity for a supported membrane.

Moisture: Any type of precipitation. In one example, moisture refers to the presence of water, often in trace amounts.

Permeance or permeation: The degree to which a material admits a flow of matter or transmits another substance. Permeable materials are those through which gases or liquids may pass. Membranes are one type of permeable material and are composed of thin sheets of natural or synthetic material. Frequently, membranes exhibit different permeances—e.g., permeation rates—for different chemical species. In this regard, permselectivity is the preferred permeation of one chemical species through a membrane with respect to another chemical species. Permselectivity of the desired permeate with respect to another chemical species is calculated as the ratio of the permeance of the desired permeate to the permeance of the other chemical species. Permselective membranes are promising in a variety of applications including gas separation, electrodialysis, metal recovery, pervaporation and battery separators.

Pore: One of many openings or void spaces in a solid substance of any kind that contribute to the substance's porosity. Porosity is a measure of the void spaces or openings in a material, and is measured as a fraction, between 0-1, or as a percentage between 0-100%.

Porous: A term used to describe a matrix or material that is permeable to fluids. For example, a porous matrix is a matrix that is permeated by an interconnected network of pores (voids) that may be filled with a fluid (such as a liquid or gas). In some examples, both the matrix and the pore network (also known as the pore space) are continuous, so as to form two interpenetrating continua. Many materials such as cements, foams, metals and ceramics can be considered porous media. In one example, a porous matrix is a nickel matrix prepared by the method of fabrication disclosed herein.

Selective Permeation: A process that allows only certain types of molecules or ions to pass through a material, such as a membrane. In some examples, the rate of passage depends on the pressure, concentration, and temperature of the molecules or solutes on either side of the membrane, as well as the permeability of the membrane to each solute. Depending on the membrane and the solute, permeability may depend on solute size, solubility, or other chemical properties. In one example, the membrane is selectively permeable to $O_2$ as compared to $H_2O$. In another example, the membrane is selectively permeable to $CO_2$ as compared to other molecules such as $H_2O$ or $N_2$.

Silicone oil: An analogue of carbon based organic compound that can form (relatively) long and complex molecules based on silicon rather than carbon, also known as a polymerized siloxane. Chains are formed of alternating silicon-oxygen atoms ( . . . Si—O—Si—O—Si . . . ) or siloxane, rather than carbon atoms ( . . . C—C—C—C . . . ). Other species attach to the tetravalent silicon atoms, not to the divalent oxygen atoms that are fully committed to forming the siloxane chain. In some examples, a silicone oil with 5,000 to 100,000 cst in viscosity is employed as the liquid fluid for an immobilized liquid membrane. In one particular example, the silicone oil is a polydimethylsiloxane (such as those commercially available from DOW CORNING Corporation, Midland, Mich. or Shin-etsu Chemical, USA).

Solubility: A physical property of a liquid multi component system describing its ability to dissolve a substance, the solute, at a specific temperature and pressure from another phase. Solubility is measured as the maximum quantity of a substance that may be dissolved in another, for example it is the maximum amount of solute that may be dissolved in a solvent.

II. Immobilized Liquid Membranes

Figure 1B:
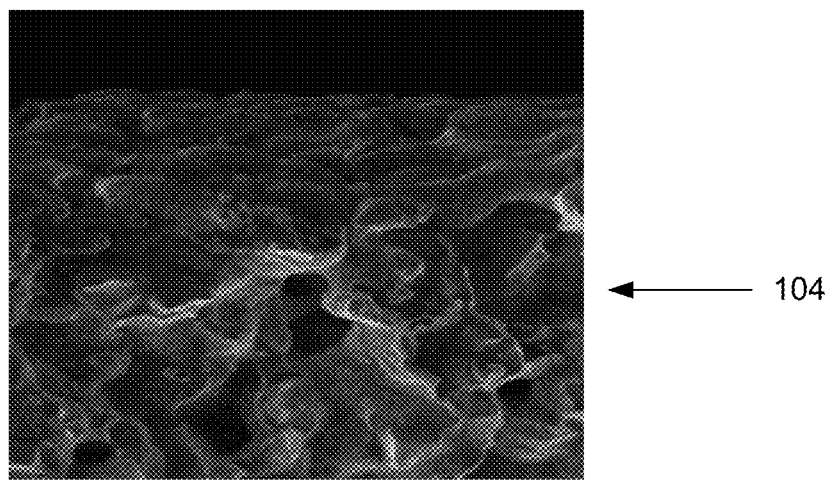
FIG. 1B is a scanning electron microscopy (SEM) micrograph illustrating pore structures of a disclosed nickel porous matrix sheet.

Disclosed herein are immobilized liquid membranes. As illustrated in FIG. 1A, an exemplary immobilized liquid membrane 100 includes a liquid fluid 102 and a porous metallic host matrix 104 ("host matrix" also referred to herein as "substrate"). FIG. 1B provides an SEM micrograph of porous metallic host matrix 104 in the absence of liquid fluid 102.

In an embodiment, a liquid fluid to be used to form an immobilized liquid membrane for $O_2/H_2O$ separation has one or more of the following properties: (1) selectively absorbs oxygen over moisture from ambient air; (2) has a sufficiently low vapor pressure or high boiling point so that the liquid does not vaporize over time; (3) has a viscosity and surface tension sufficient to allow liquid penetration of and fixation in, the host matrix pores; (4) does not react with the host matrix material; and (5) does not interfere with the performance of the device, such as a battery. It is the combination of these five properties that determines whether a liquid fluid can be used to form an immobilized liquid membrane with selective $O_2/H_2O$ separation. For example, liquid fluids with high $O_2$ selectivity upon $H_2O$ vapor, such as 3M™ FLUORINERT Electronic Liquid FC-40 (3M™ Corporation, St. Paul, Minn.), but low viscosity and boiling point could not be immobilized in the disclosed nickel matrix.

In an example, an immobilized liquid membrane includes a liquid fluid that is stable and operable under separation conditions of from −50° C. to 300° C. In one example, the liquid fluid is a hydrocarbon fluid, such as a hydrocarbon oil of high boiling points (>100° C.), hydrocarbon oil with 5,000 to 100,000 cst in viscosity may be employed as a liquid fluid for an immobilized liquid membrane. In some examples, the liquid fluid is a fluorohydrocarbon compounds or other like compounds. In particular examples, the liquid fluid is a silicone oil, such as a silicone oil with 5,000 to 100,000 cst in viscosity. In particular examples, a silicone oil is a polydimethylsiloxane (such as those commercially available from DOW CORNING Corporation, Midland, Mich. or Shin-etsu Chemical, USA).

In one embodiment of the disclosed membrane the liquid fluid is a silicone oil of higher $O_2$ solubility than other molecules, such as $CO_2$, $N_2$, or $H_2O$. For example, the silicone oil is one in which $O_2$ is at least 10%, 20%, 30%, 40%, 50%, 60%, 70%, 80%, or 90% more soluble in the oil than other molecules, such as $CO_2$, $N_2$, or $H_2O$. In some examples, the permeation flux of $O_2$ in an immobilized liquid membrane is about two orders of magnitude higher than $H_2O$. In another example, the liquid fluid is a silicone oil of higher $CO_2$ solubility than other molecules, such as $O_2$, $N_2$, or $H_2O$. For example, the silicone oil is one in which $CO_2$ is at least 10%, 20%, 30%, 40%, 50%, 60%, 70%, 80%, or 90% more soluble in the oil than other molecules, such as $O_2$, $N_2$, or $H_2O$. In some examples, the liquid fluid is a fluid with a higher $CO_2$ solubility than to amine-based or carbonate based solutions. For example, the silicone oil is one in which $CO_2$ is at least 10%, 20%, 30%, 40%, 50%, 60%, 70%, 80%, or 90% more soluble in the oil than amine-based or carbonate based solutions.

In some embodiments, the liquid fluid is a polydimethlysiloxane, such as a commercially available polydimethylsiloxane, including, but not limited to, Shin-etsu DM-fluid (a polydimethylsiloxane composed of organic methyl groups and inorganic siloxane bonds, such as DMF-100,000), DOW CORNING DC200(R)® fluid (10,000 cst), DOW CORNING 200® fluid (100,000 cst) or other like commercially available polydimethlysiloxanes.

Capillary forces are a major force to retain the liquid fluid in the presently disclosed porous nickel and PTFE matrices having pore sizes of less than 10 micrometers, such as from ranging from ten nanometers to 2 micrometers. In the immobilized fluid membrane, the liquid fluid is bound to a substrate such as to an embodiment of the disclosed porous metallic host matrices. Certain embodiments of the disclosed porous metallic host matrix are formed of one or more durable inorganic materials such as nickel, titanium, aluminum alloy, nickel alloy, iron alloy, and stainless steel.

The pore size of the matrix is particularly important because it needs to be of a size sufficient to retain a liquid fluid during use of the matrix and also provide a surface for selective permeation of certain molecules. Prior to the present disclosure, a metallic porous matrix including a pore size of less than 10 μm and a thickness of less than 50 μm was not available. For example, commercial ceramic or metallic matrices (such as titanium) were typically at least 100 μm thick and often include a rough pore structure that was not uniform (see Prior Art FIGS. 2A and 2B, respectively). As such, use of such prior art matrices was not desirable in a liquid immobilized membrane because the matrix was too thick to accommodate many batteries and included a pore structure that was rough and not small enough to immobilize or fix a liquid fluid within the pore during operation. Instead, in use, the liquid fluid would be expelled from the pore during operation and result in a leaky membrane. The presently disclosed metallic matrix with a thickness, for example, of less than 200 μm, such as less than 100 μm, 50 μm or 30 μm, and a pore size of less than 10 μm allows the liquid fluid, such as a silicone oil, to be retained within the pore by providing a uniform, relatively smooth surface to which the oil can adhere by surface tension during operation to provide a means to selectively absorb specific molecules. A larger and/or non-uniform pore is not able to retain the liquid during operation of the membrane.

The porosity of the matrix is also of particular importance. From a permeability point of view, the highest porosity is desirable since the amount of liquid to be hosted increases with the porosity and pores tend to be more likely connected to each other at high porosity. However, the mechanical strength and integrity of the membrane decreases with increasing porosity. Therefore, a preferred porosity is 25% to 80%, such as 30% to 60%.

In some embodiments, the pore size of the metallic host matrix is uniform across and within the matrix. For example, each pore in the matrix is within at least 50%, such as 55%, 60%, 70%, 75%, 80%, 85%, 90% or more, of the same size as the other pores in a given matrix. Depending upon the use and desired properties, different matrices can have different pore sizes. For a matrix including circular pores, pore size can vary from a diameter of 1 nm to 100 μm, such as 10 nm to 50 μm, 100 nm to 30 μm, 200 nm to 20 μm, 500 nm to 10 μm, including 1 nm, 10 nm, 20 nm, 30 nm, 40 nm, 50 nm, 60 nm, 70 nm, 80 nm, 90 nm, 100 nm, 150 nm, 200 nm, 250 nm, 300 nm, 350 nm, 400 nm, 450 nm, 500 nm, 750 nm, 1 μm, 2 μm, 10 μm, 20 μm, 30 μm, 40 μm, 50 μm, 60 70 μm, 80 μm or 90 μm. In some embodiments, the pores are less than 10 μm, such as less than 5 μm, less than 2 μm, or less than 1 μm in size.

Figure 3A:
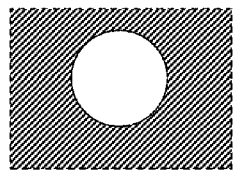
FIGS. 3A, 3B, 3C, and 3D are cross-sectional views of certain pore shapes included within various embodiments of the disclosed nickel porous matrix sheet.
Figure 3B:
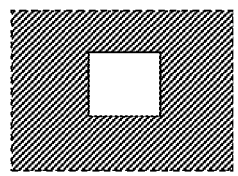
Figure 3:
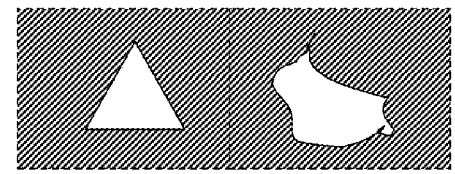

In addition to circular pores, it is contemplated that pores can be of any shape, including square, rectangular, diamond and the like. Exemplary matrices with non-circular pores have a porosity of at least 0.1, such as 0.2, 0.3, 0.4, 0.5, 0.6, 0.7, 0.8, or 0.9 per unit volume as measured by the volume/density method (pore volume=total volume−material volume). In one example, pores are of irregular shape, defined by the grain boundaries of the matrix material. FIG. 3 illustrates a cross-sectional view of various shapes of potential pore openings. It is contemplated that pore shape can vary due to the method of formation. In some examples, a matrix includes pores of more than one shape. Size of the pore for all different dimensions can be characterized by the hydraulic diameter above. For example, pore size can be characterized by the following equation:

1. $$d_h = 4 \cdot \frac{SA_P}{L_P}$$

2. $SA_P$ = cross-sectional area of pore opening

3. $L_p$ = total length of the perimeter that defines the pore

4.

-continued

5. For rounded pore of diameter, $d$

6. $d_h = 4 \cdot \dfrac{\pi d^2/4}{\pi d} = d$

7. For square-shaped pore of with, $L$

8. $d_h = 4 \cdot \dfrac{L^2}{4L} = L$

9. For rectangle-shaped pore of with, $w$, and length, $L$

10. $d_h = 4 \cdot \dfrac{W \cdot L}{2W + 2L} = \dfrac{2W}{W/L + 1}$,

If $W/L \ll 1$, $d_h = 2W$.

Dimensions and shapes of pores in a porous matrix can be physically observed by microscopes, such as electron scanning microscopy (ESM). Any method known to those of skill in the art can be used to determine the size of pores of varying shape, including microscopy. For example, pores of various shapes can have a diameter varying from 1 nm to 100 µm, such as 10 nm to 50 µm, 100 nm to 30 µm, 200 nm to 20 µm, 500 nm to 10 µm, including 1 nm, 10 nm, 20 nm, 30 nm, 40 nm, 50 nm, 60 nm, 70 nm, 80 nm, 90 nm, 100 nm, 150 nm, 200 nm, 250 nm, 300 nm, 350 nm, 400 nm, 450 nm, 500 nm, 750 nm, 1 µm, 2 µm, 10 µm, 20 µm, 30 µm, 40 µm, 50 µm, 60 µm, 70 µm, 80 µm or 90 µm. In some embodiments, the pores are less than 10 µm, such as less than 5 µm, less than 2 µm, or less than 1 µm in size.

Porosity can be measured by any means known to those of ordinary skill in the art. In one example, porosity is measured using the Archimedes method. For example, the material is weighed dry, then submerged in a liquid. A vacuum is applied to remove air from the porosity and then the sample is weighed submerged in the same fluid used to fill the porosity, and finally the mass of the sample is measured saturated with the fluid (excess removed from surfaces, but not pulled out of voids in the sample. The porosity can then be calculated by the following formula:

$$\text{Porosity} = \dfrac{\text{Saturated Mass} - \text{Dry Mass}}{\text{Saturated Mass} - \text{Submersed Mass}}$$

In some embodiments, a portion of the pores are isolated and do not connect with other pores within the matrix. However, a sufficient number of pores need to be connected in order to facilitate efficient permeation. Connectivity of the pore can be effectively characterized by the porosity. A sufficient number of pores will be connected to each other when the porosity is above a certain level, such as at least greater than 20%, such as at least 30%, at least 40%, at least 50%, at least 60%, at least 70%, at least 75%, at least 80%, at least 85%, at least 90%, at least 95% or more, including 25%, 30%, 35%, 40%, 45%, 50%, 60%, 65%, 70%, 75%, 80%, 85%, 90%, 95%, 98%, or 100%. The pore network can be physically observed by SEM by looking at both surface and cross-section.

In one embodiment of the disclosed matrices, the porosity (a measure of void spaces or openings in the metallic host matrix) is substantially uniform across its cross section and as measured as a percentage of the percent openings relative to the entire matrix can be 20% to 80% with a variation of ±5%, such as 25%, 30%, 35%, 40%, 45%, 50%, 55%, 60%, 65%, 70%, or 75% with a preferred range being from 25% to 75%.

The metallic host matrix shape and size overall is dictated by the intended use of the resulting membrane. For example, for use in batteries of a coin-cell type, the matrix would preferably be of disc shape with diameter of, for example, 11/16 inches (1.746 cm). For use in batteries of a pouch-type cell, the matrix would preferably be of square shape with dimension of 2 inches (5.08 cm) by 2 inches (5.08 cm). Further, batteries of size 4.6 cm by 4.6 cm utilize a liquid immobilized membrane including a nickel matrix or matrix of 4 cm by 4 cm in size, whereas a battery of a diameter of 11/16 inch would utilize a nickel matrix disc with diameter of 11/16 inch. For use in certain fuel cell applications the metallic host matrix, the size and shape of the matrix is determined by the size and type of the fuel cell.

The thickness of certain embodiments of the disclosed metallic host matrix can vary depending upon desired strength needed and the support the matrix needs to provide; however, in particular embodiments the thickness is less than 200 µm, such as less than or equal to 100 µm, less than or equal to 80 µm, less than or equal to 50 µm, less than or equal to 25 µm, such as between 100 µm and 10 µm, 80 µm and 20 µm, 60 µm and 30 µm, including 90 µm, 80 µm, 70 µm, 60 µm, 50 µm, 40 µm, 35 µm, 30 µm, 25 µm or less. Thinner membranes provide higher transport rates of the target component through the composite liquid membrane.

In some examples, the disclosed metallic matrix includes a thin film (sometimes functioning as an adhesive coating), such as polyflurohydrocarbon materials, including PTFE. In the prior art devices, the thin PTFE membrane was weak and could not be self-supported. The PTFE thin film layer needed to be heated at high temperatures to become self-supporting but the available small pore matrices (less than about 10 µm or 5 µm or 2 µm or less) could not withstand the required heating temperature. The available metallic matrices were of too large of pore size for making a useful PTFE membrane. By use of the porous metallic matrix of the present invention, a thin layer of PTFE membrane can be coated or deposited and heated to the necessary temperature such that a self-supporting PTFE host matrix is formed. Since the membrane permeability is reversely proportional to the thickness, the coated thin film membrane provides high permeability while the matrix provides the mechanical integrity. For example, in one embodiment a disclosed metallic matrix is coated with a thin layer of PTFE (approximately less than or equal to 50 µm thick, such as less than or equal to 25, less than or equal to 20 µm, less than 10 µm, less than 5 µm, less than 2 µm, less than 0.1 µm).

In one example, a porous, self-supported PTFE host matrix is formed. In one particular example, the porous, self-supported PTFE host matrix has a plurality of pores of less than or equal to 10 µm, 8 µm, 5 µm, 2 µm, 1 µm or 0.1 µm and sizes therebetween. The PTFE host matrix has a thickness of less than or equal to 50 µm, such as less than or equal to 40 µm, less than or equal to 30 µm, less than or equal to 25 µm or less than or equal to 10 µm. For example, the thickness is less than or equal to 25 µm. An immobilized liquid fluid is formed on the porous, self-supported PTFE host matrix and the resulting immobilized liquid membrane is thus capable of selective permeation of a first type of molecule over a second type of molecule. In one example, the first type of molecule is oxygen and the second type of molecule is water. In one particular example, a Ni host matrix is spun-coated with DuPont™ PTFE TE-3859 fluoropolymer resin as detailed herein.

In a certain embodiment the disclosed immobilized liquid membrane is used for selective gas separation. For example, a disclosed immobilized liquid membrane immobilizes a liquid fluid, thereby allowing selective permeation of at least one or at least one type of molecule over another type of molecule. In some examples, the immobilized liquid membrane allows selective permeation of $O_2$ over water. In some examples, the permeation flux of $O_2$ in an immobilized liquid membrane is about two orders of magnitude higher than $H_2O$. For example, the immobilized liquid membrane has an $O_2$ permeance of greater than $1.7\times10^{-10}$, such as at least $1\times10^{-9}$, $5\times10^{-9}$, $1\times10^{-8}$, $5\times10^{-8}$, $1\times10^{-7}$, $3\times10^{-7}$, $5\times10^{-7}$, or $8\times10^{-7}$. In one example, the selectivity factor of the immobilized liquid membrane for $O_2$ is at least greater than 1 at room temperature as compared to $H_2O$, such as 1.2, 1.4, 1.6, 1.8, or 2.

In further examples, a matrix includes the smallest pore size consistent with efficient transport of the desired molecule, and the highest porosity and smallest thickness consistent with adequate mechanical integrity. For example, if in a lithium/air battery, a pore size of less than 10 μm and matrix thickness of 50 μm or less is desirable for efficient permeation of $O_2$ as compared to other molecules. For efficient capture of $CO_2$, the membrane has a pore size that results in a selectivity factor value of greater than 5, such as 7, 8, 9 or 10 for $CO_2$ than compared to $N_2$, $O_2$ or $H_2$ and a thickness of less than 50 μm. In an immobilized liquid membrane for $CO_2$ separation, low viscosity liquid fluids, such as aqueous solution or ionic liquid are immobilized in a nickel matrix with pore size of 10 μm. In some examples, such membranes include an additional zeolite membrane with a pore size of less than 1 nm on the permeate side surface of the Ni matrix to facilitate liquid retention in Ni matrix pores.

In some examples, an immobilized liquid membrane has a pore size of less than 10 μm for 90% of the pores, more preferably less than 2 μm for 90% of the pores, a membrane thickness of less than 200 μm, more preferably less than 100 μm, a mechanical strength as defined by being able to maintain structural integrity (i.e., not being torn into parts or deformed in any manner that would negatively affect its operability) when pulled from two opposite sides at a force of 10 Newtons per cm or not being broken when bent into a 90° angle from a 180° of a flat sheet.

III. Methods of Making Metallic Matrix or Substrate

Prior to the invention herein, immobilized liquid membranes did not employ such oil compositions as the liquid fluid. Further, prior to the disclosed methods of fabrication of the disclosed metallic matrices, a metallic matrix of a thickness of, for example, less than 100 μm and a pore size of, for example, less than 10 μm was not available. In some embodiments, the presently disclosed method of fabrication employs tapecasting in combination with firing and reduction steps with different slurry compositions to prepare the disclosed metallic matrices.

The disclosed method of fabrication produces a porous metallic matrix by starting with a metal oxide, such as nickel oxide. Metal oxides are easily fractured, thus allowing the particle size to be tailored, using a milling process. The milled powder generated by the milling process is then used to form matrices/substrates with relatively uniform thickness via tape casting. The tape incorporates one or more pore formers facilitating a relatively uniform porosity within the matrix. This pore former is removed during sintering to produce a porous metal oxide matrix that is near net size and thickness. This matrix is then reduced in a second step to convert the metal oxide to pure metal (e.g., nickel oxide to nickel metal). Since the microstructure is fixed due to the sintering as a metal oxide, a significant change in pore size is not observed. If necessary, the metal matrix can be flattened further to provide an even smoother surface via a hot pressing step, also carried out in a reducing atmosphere to prohibit re-oxidation of the metal. As illustrated in detail in the Examples below, use of an immobilized liquid membrane including an embodiment of the disclosed nickel matrix and silicone oil provides, for example, greater than 400 hours of battery operation time in a Li/Air battery as compared to only 76 hours of operation time with a membrane including laminated PTFE without significant degradation. These studies clearly demonstrate the superiority of the disclosed membranes as compared to prior art membranes.

Also disclosed herein are methods of making metallic substrates or matrices with the particularly small, disclosed pore size. In one embodiment, a method of making a metallic matrix or substrate, such as those described herein including a nickel matrix, includes attrition milling the metal oxide powder to obtain a substantially uniform, sub-micron particle size. The method further includes mixing the resulting powder with solvents, dispersants and pore formers to create a slurry. In one particular example, the method includes mixing the resulting powder with solvents, dispersants and pore formers by ball milling to yield a substantially homogeneous fluid suitable for tapecasting. In some examples, a plastic binder and a plasticizer are also added to the slurry to create a mixture appropriate for tape casting. In one particular embodiment, the slurry composition includes by volume (%) or weight (%), respectively: (1) nickel powder, 18.95% or 62.96%; (2) CANCARB 990 Carbon Black, 4.74% or 4.22%; (3) methyl ethyl ketone, 47.41% or 19.01%; (4) ethanol, 11.85% or 4.63%; (5) pore binder, polyvinylbutyral B-79, 9.45% or 5.08%; (6) anionic surfactants EMPHOS PS-21A, 1.29% or 0.64%; and (7) butyl benzyl phthalate (BBP), 6.30% or 3.45%. In some examples, 2-propanol may be included in the slurry composition. For example, tape casting is used to form sheets of uniform thickness of roughly half the desired thickness of the metallic substrate. In one particular example, the method includes casting the slurry onto a relatively smooth and flat support surface to form a green body comprising a substantially continuous, uniform layer of thickness ranging from 10 μm to 500 μm, such as 25 μm to 250 μm, including, but not limited to 10 μm, 20 μm, 30 μm, 40 μm, 50 μm, 75 μm, 100 μm, 200 μm, 300 μm, 400 μm or 500 μm thick. Following tape casting, sheets may be bonded together, such as by lamination, to create a full-thickness matrix or substrate with as uniform a thickness and particle distribution within the sheet, as possible. The resulting matrix can then be cut to the appropriate size, such as a size that accounts for shrinkage during sintering. The method also includes removing organic materials on the resulting green body matrix and sintering the metal oxide particles to create the precursor substrate, such as by placing the resulting matrix into a furnace. For example, the method may include removing organic materials on the resulting matrix and sintering the metal oxide particles in the presence of oxygen at temperatures ranging from 300° C. to 1400° C. to create the precursor substrate. In some examples, the method includes further processing of the precursor substrate to remove the oxide. Any suitable method known to one of the skill in the art can be used to remove the oxide, including exposing the precursor substrate to a reducing environment. For example, reduction is conducted in the presence of hydrogen gas at temperatures ranging from 300° C. to 1400° C. In an example, the method further includes exposing the resulting metal substrate to a reducing atmosphere in order to flatten the substrate to remove stresses in the structure. Any method can be used to flatten the resulting substrate/matrix including, applying a hot press to apply load to the matrix/substrate. In an example, hot pressing is performed in a reducing atmosphere or in the presence of inert gas at temperatures ranging from 300° C. to 1400° C.

In certain embodiments the methods produce matrices with substantially uniform pore size, and/or thickness, and/or uniform strength as detailed herein.

IV. Methods of Preparing an Immobilized Liquid Membrane

Disclosed herein are methods for preparing an immobilized liquid membrane. In one embodiment, a method of preparing an immobilized liquid membrane includes soaking a porous host matrix in a liquid fluid for a period of time sufficient to allow the liquid fluid to penetrate pores located within the porous host matrix. The time duration can range from a few minutes to a few days and can occur at various temperatures ranging from 20° C. to 300° C. under atmospheric pressure depending upon the properties of the liquid fluid and porous host matrix employed. In some examples, the method includes removing any excess liquid on the exterior surface of the host matrix sheet prior to use. Any method known to those of skill in the art can be used to remove residual fluid including wiping the exterior surface with a material capable of absorbing the excess fluid.

In some examples, the soaking of the liquid membrane occurs at pressures lower than atmospheric pressure, such as at pressures of −60 kPa. In such example, residual gas inside the host pores is removed as the liquid is being soaked into the pores.

In additional examples, the method of preparing an immobilized liquid membrane includes modifying the surface properties of the metallic matrix to enhance the adhesion of the liquid fluid to the matrix prior to exposing the matrix to the liquid fluid. For example, the method can include altering the surface chemistry of the metallic matrix (such as from hydrophilic to hydrophobic) prior to soaking the matrix with the liquid fluid. Any pretreatment known to those of ordinary skill in the art can be used to alter the surface chemistry. In one particular example, a metallic matrix is placed above a silicone elastomer base (such as polydimethylsiloxane, PDMS, viscosity 5,000 cst) in a covered glass container, and heated to 235° C. for at least 60 minutes, such as at least 90 minutes, at least 120 minutes, at least 150 minutes, at least 180 minutes, at least 210 minutes, or at least 240 minutes. Following pretreatment, the resulting matrix is cooled to room temperature prior to soaking the matrix in a selected liquid fluid.

V. Methods of Producing a Support Thin Film Membrane

Prior to the disclosed methods of preparing a support thin film membrane, such thin film membranes could not be fabricated because the available porous metallic or ceramic sheets included to large of pore size (from 10 μm to 50 μm) and the available polymeric matrices consisted of materials that could not withstand high temperatures (such as 360° C.) which were required for fabrication. Also, the thickness of the available coatings was such that the permeation flux was inadequate and resulted in membranes with low permeability/selectivity.

The presently disclosed thin film PTFE membrane is of a thickness (for example, less than or equal to 50 μm, such as less than 40 μm, less than 30 μm, less than 25 μm for a self-supported thin PTFE membrane and less than or equal to 50 μm, such as less than or equal to 40 μm, less than or equal to 30 μm, less than or equal to 25 μm, less than or equal to 10 μm, less than or equal to 5 μm, or less than or equal to 1 μm) that provides a desirable permeation flux (for example, as illustrated in the examples below, the thinner the thin film membrane, the higher the permeation flux). The disclosed thinner membranes are possible because the employed metal matrix, such as a disclosed nickel matrix, allows the thermal treatment at temperatures (for example, 360° C.) that were not possible with other polymeric matrices.

Exemplary methods of producing a support thin film membrane are disclosed herein. In some examples, the method includes depositing a thin film membrane, such as a polyflurohydrocarbon material, including, but not limited to PTFE, and other like compounds, as a membrane less than or equal to 50 μm, such as less than 40 μm, less than 30 μm, less than 25 μm, less than 20 μm thick (including less that 10 μm thick) onto a porous metallic substrate matrix. For example, in one embodiment a disclosed metallic matrix is coated with a thin layer of PTFE (approximately <20 μm thick, such as less than 10 μm, less than 5 μm, less than 2 μm, less than 0.1 μm). In one particular example, a Ni host matrix is spun-coated with DuPont™ PTFE TE-3859 fluoropolymer resin as detailed herein. In some examples, a wet chemistry approach is employed. In other examples, a dry chemistry approach is utilized. In the wet chemistry approach, a precursor membrane material (such as PTFE resin particles) is coated onto the substrate/matrix surface by a spin-coating or dip-coating technique to form a continuous coating layer of a thickness less than 20 μm. The coated matrix/sheet is dried to remove any solvent and is thermally treated to bond the coating onto the substrate to generate a desired texture of the coated membrane. For example, if a dense-film is needed, the thermal treatment process sinters the coated material into a continuous fluid without any pores and/or cracks. In the dry chemistry coating approach, the membrane material can be sputtered onto the substrate/matrix surface and the resulting coating is thermally treated to achieve desired textures.

In one example, a porous, self-supported PTFE host matrix is formed by the disclosed methods. In one particular example, the porous, self-supported PTFE host matrix has a plurality of pores and has a thickness of the porous, self-supported PTFE host matrix having a thickness of equal to or less than 50 μm, such as less than or equal to 40 μm, less than or equal to 30 μm, less than or equal to 25 μm. For example, the thickness is less than or equal to 25 μm. The pore sizes of the disclosed PTFE host matrix are the same as those pore sizes mentioned in relation to the disclosed metallic host matrix. An immobilized liquid fluid is formed on the porous, self-supported PTFE host matrix and the immobilized liquid membrane is thus capable of selective permeation of a first type of molecule over a second type of molecule. In one example, the first type of molecule is oxygen and the second type of molecule is water.

VI. Devices Including an Immobilized Liquid Membrane

Figure 4A:
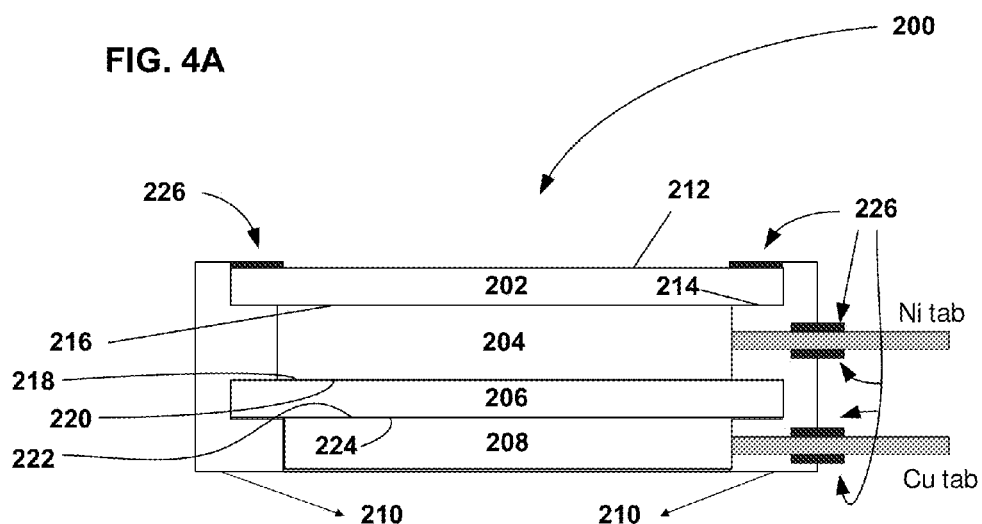
FIGS. 4A and 4B are schematics illustrating exemplary Li/Air pouch type battery assembly structure including an embodiment of the disclosed immobilized liquid membrane.
Figure 4B:
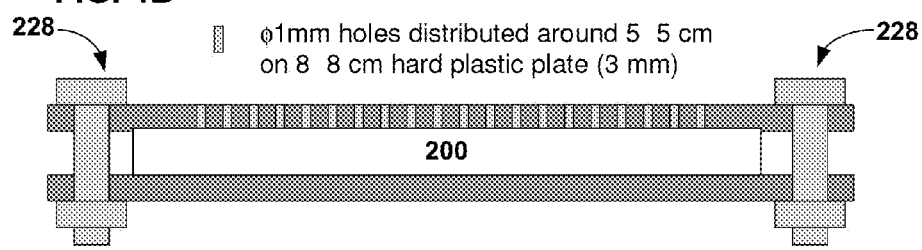
Figure 5:
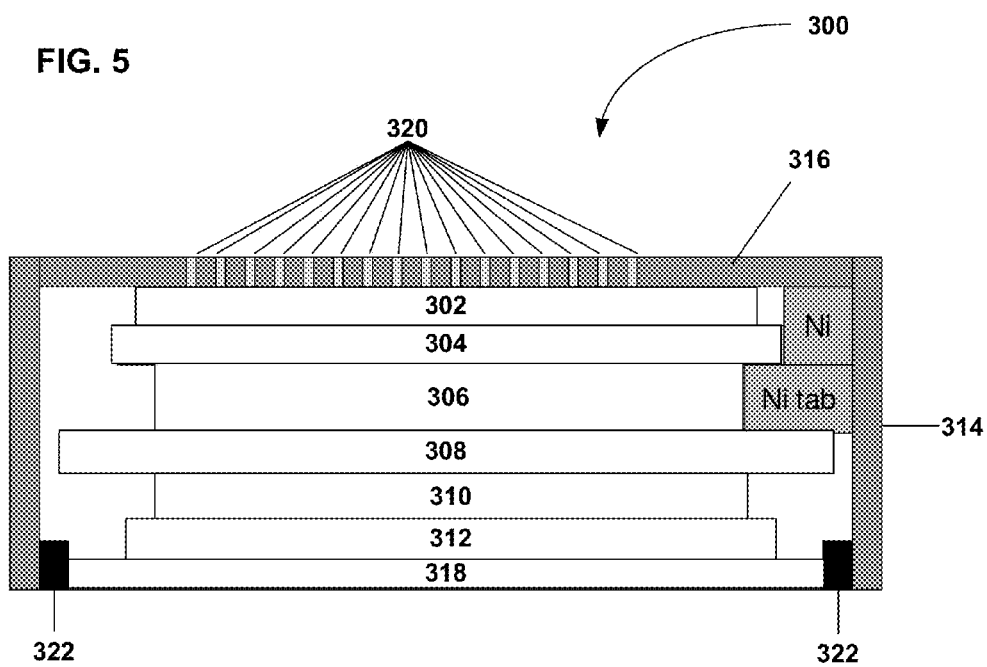
FIG. 5 is a schematic illustrating an exemplary Li/Air coin type battery assembly structure.

Also provided are devices that include embodiments of the disclosed immobilized liquid membranes. In one example, the device is a lithium/air (Li/Air) battery, such as a Li/Air pouch-type battery (as illustrated in FIGS. 4A and 4B) or a Li/Air coin-type battery (as illustrated in FIG. 5). As illustrated in FIG. 4A, an exemplary Li/Air pouch-type cell 200 includes an immobilized liquid membrane 202 that is selective for $O_2$, an air electrode 204 with electrolyte, a separator 206, a Li foil Cu mesh substrate 208 and a metallized plastic bag 210. Any air electrode with electrolyte, separator, substrate or metallized plastic bag known to one of ordinary skill in the art to have desirable characteristics can be employed in a Li/Air pouch-type battery. In some examples, a Li/Air pouch-type battery includes a lithium metal foil (such as one of approximately 0.5 mm in thickness), used as an anode. In an example, a mesh, such as a 55 μm thick copper mesh is laminated with lithium foil and serves as the current collector on the anode side. In one example, microporous polypropylene (Celgard Product No. 2502; Celgrad LLC, Charlotte, N.C.) is used as a separator. In one example, a Li-Air pouch-type battery includes an electrolyte solution composed of 1 M $LiPF_6$ salts dissolved in organic solvent (such as, but not limited to, ethylene carbonate (EC)/diethyl carbonate (DEC) (1:2), propylene carbonate (PC) PC:DME (1:2), and PC:EC (1:1), any solvent with relatively high oxygen solubility, low viscosity, high conductivity, and low vapor pressure can be employed.

In one embodiment, the immobilized liquid membrane 202 has a first surface 212 and a second surface 214. Further, the air electrode 204 has a first surface 216 and a second surface 218 and the separator 206 has a first surface 220 and a second surface 222. The immobilized liquid membrane 202 is attached to the air electrode 204 so that the second surface 214 of the immobilized membrane 202 is adjacent to the first surface 216 of the air electrode 204. For example, the membrane 202 is positioned so that it substantially covers the first surface 216 of such electrode 204. The membrane may be attached to the air electrode by any means known to one of ordinary skill in the art. In some embodiments, the membrane is attached to the air electrode using a coin cell package. The selective membrane is pressed on the air electrode and attached by gluing, package frame, or clamping. The second surface 214 of the air electrode 204 is coupled to the first surface 220 of the separator 206 so that the second surface 214 of the air electrode 204 is adjacent to the first surface of the separator. For example, the air electrode 204 is positioned so that it substantially covers the first surface 220 of separator 206. The air electrode may be attached to the separator by any means known to one of ordinary skill in the art. In some embodiments, the air electrode 204 is attached to the first surface 220 of the separator 206 using a coin cell package. In such embodiment, the components are laminated and packaged together by package techniques, such as clamping, welding or gluing.

The second surface 222 of the separator 206 is coupled the Li foil Cu mesh substrate 208 so that the separator 206 is adjacent to a first surface 224 of the Li foil Cu mesh substrate 208. For example, the separator 206 is positioned so that it substantially covers the first surface 224 of such Li foil Cu mesh substrate 208. The separator 206 may be attached to the Li foil Cu mesh substrate 208 by any means known to one of ordinary skill in the art. The metallized plastic bag 210 is attached to the first surface 212 of the immobilized membrane 202 by any means known to one of skill in the art including an adhesive 226, such as thermal sealing adhesive glue. The resulting cell can then be secured within the battery by fasteners (collectively denoted as 228 in FIG. 4A), including screws, clips, adhesives, and the like.

Referring to FIG. 5, an embodiment of a Li/Air coin-type battery assembly structure 300 is provided that includes a protective film 302, an immobilized liquid membrane 304 (including any of those disclosed herein), an air electrode 306 with electrolyte, a separator 308, a Li foil 310, and a stainless steel spacer 312, all of which are encapsulated by a stainless coin cell container 314. In some examples, the air electrode 306 is formed with porous carbon materials whereas the electrolyte is an organic solvent (such as those known to one of ordinary skill in the art, including, but not limited to those described herein).

The stainless coin cell container 314 includes a stainless coin cell pan 316 and a stainless coin cell cover 318. The stainless coin cell pan 316 includes a plurality of holes (denoted as 320), such as nineteen 2 mm diameter holes. Further, a gasket 322 is positioned between each end of the stainless coin cell cover 318 and pan 316 to assist with sealing of the container.

During battery operation, air diffuses through the plurality of holes 320 providing air to the $O_2$ selective membrane 304. The protective film 302 is optional. In some embodiments, the film is present to protect the membrane during the packaging process for this particular battery configuration.

The disclosure is further illustrated by the following non-limiting Examples.

EXAMPLES

Example 1

Fabrication of Porous Ni Host Matrix

This example describes methods used to fabricate certain embodiments of the disclosed metallic porous matrices, such as nickel substrates, that can be used in liquid immobilized membranes for gas separation.

Porous nickel 2×6 inch sheets of consistent quality (i.e., mechanical strength, pore size, and surface smoothness) were prepared and utilized in the disclosed liquid immobilized membranes. In the initial stages of developing the disclosed porous nickel substrates, the substrates did not have a uniform pore size due to using a non-uniform particle sized nickel oxide powder. When sintered, the void spaces between particles varied as a function of the size of the particles surrounding them. This resulted in a less than ideal surface that was rough and of a varying thickness (see FIG. 6A). However, after solving a series of problems (such as warpage of the sheet and non-uniform pore size and pore distribution) through use of attrition milling to create a uniform particle size starting powder, use of constrainment during sintering, and adjusting/controlling the atmosphere during sintering to eliminate warpage, the resulting sheets had a uniform pore size of approximately 1 μm and a thickness of 50 μm (FIGS. 6B and 6C).

Example 2

Preparation and Characterization of Immobilized Liquid Membranes

This example describes methods used to prepare immobilized liquid membranes, including immobilized liquid membranes including a fabricated porous nickel matrix as described in Example 1. This example also illustrates that lithium ion battery performance is dependent upon the type of immobilized liquid membrane utilized as a cathode barrier layer for such battery.

Four batches of membrane samples of different compositions or different structures were prepared and tested for battery performance. Each of these batches is described in detail below.

Batch #1 Membranes

The membrane samples prepared with different compositions and structures for the first batch of battery testing are listed Tables 1a-c. Table 1a provides four membranes and the conditions used for their preparation. The four membranes include liquid oil immobilized in different porous matrices (porous nickel matrix/sheet versus commercial porous PTFE membrane sheet), DOW CORNING 200 fluid with viscosities of 10,000 cst (SIGMA-ALDRICH Product No. 378402, St. Louis, Mo.) and 100,000 cst (SIGMA-ALDRICH Product No. 378437, St. Louis, Mo.), Shin-etsu DMF-100,000 (obtained as a sample from Shin-etsu, USA) from two different commercial sources (Shinetsu oil versus DC200) immobilized in the same matrix, and the same immobilized oil membrane packed in different ways for the battery testing. Liquid immobilized membranes formed with porous nickel matrices or with commercial porous PTFE membrane sheets were prepared by were prepared by methods described herein. Preparation procedure of Mupor/silicone oil membrane including Mupor PM3T (thickness 102 um, pore size 2 um) or Mupor PM6M (thickness 102 um, pore size 1~2 um) included loading silicone oils with various viscosities (e.g., 10,000 cst, 100,000 cst) into the Mupor PTFE pores at room temperatures for various times. In particular, 50 ml of silicone oil was contained in a 200 ml glass petri dish. The Mupor PTFE matrix was then layed horizontally on the top of silicone oil. The other 50 ml of silicone oil was poured on top of the Mupor PTFE matrix. The petri dish was then vacuumed at −60 kPa in a vacuum oven. Bubbles were observed in the oil during vacuuming and finally no bubble could be observed at the end of vacuuming. The Mupor PTFE membrane was then carefully taken out from the oil. Excessive oil was slowly wiped off from the PTFE surface with a laboratory wipe. The Mupor PTFE membrane appeared transparent after the oil loading, instead of white in color as before oil loading.

TABLE 1a

Liquid oil immobilized in porous matrix sheets

| Sample name | Description |
| --- | --- |
| Shinetsu oil + Ni | Porous nickel sheet soaked with Shinetsu oil at 25° C. |
| Shinetsu oil + Mupor/PM3T | Commercial porous Mupor PTFE sheet soaked with Shinetsu oil at 25° C. |
| DC200 oil + Mupor/PM3T | Commercial porous Mupor PTFE sheet soaked with DC 200 oil at 25° C., supported by PM3T membrane |
| DC200 oil + Mupor/PM3T + extra | Commercial porous Mupor PTFE sheet soaked with DC 200 oil at 25° C., supported by PM3T membrane, plus extra PM3T gas diffusion layer |

Membranes listed in Table 1b include two structured layers. In the DC200 oil+Ni/silicalite membrane, a continuous silicalite zeolite membrane of well-defined pore size (0.57 nm) was first synthesized on one side of the nickel matrix/substrate and then, the liquid oil was soaked into the porous nickel matrix/substrate from the other side. The silicalite membrane was hypothesized to hinder diffusion loss of the electrolyte solvent and further confine the liquid oil membrane. In the DC200 oil +Ni/5A membrane, the nickel matrix was coated with a thin layer of hydrophilic 5A zeolite on one side while another side was filled with the liquid oil. As 5A zeolite is an effective moisture adsorbent, it was included to scrub moisture that leaked through the oil membrane.

TABLE 1b

Liquid oil immobilized in porous Ni/5A coating

| Sample name | Description |
| --- | --- |
| DC200 oil + Ni/Silicalite | DC200 oil-soaked into Ni at 25° C. of Ni/silicalite membrane |
| DC200 oil + Ni/5A | DC200 oil-soaked into Ni at 220° C. of Ni/5A zeolite coating |
| DC200 oil + Ni/5A | DC200 oil-soaked into Ni at 220° C. of Ni/5A zeolite coating of different slurry |

Among various materials analyzed, polyflurohydrocarbon materials such as PTFE usually provide high $O_2$ solubility and minimal moisture solubility. Although polyflurohydrocarbon materials such as PTFE can be made in porous membrane forms, the pore diffusion transport does not provide any selective $O_2$ permeation over $H_2O$. Further, $H_2O$ diffusion is often faster than $O_2$ in the porous membrane. Also, polyflurohydrocarbon materials made in the dense film form such as PTFE tape are too thick (e.g., 100-300 μm thick) to provide sufficient $O_2$ permeation flux. Therefore, studies were performed to determine if a thin layer of PTFE membrane (<20 μm thick or thinner) on the disclosed porous nickel matrix sheet (as prepared according to Example 1) resulted in sufficient $O_2$ permeation flux.

Figure 7A:
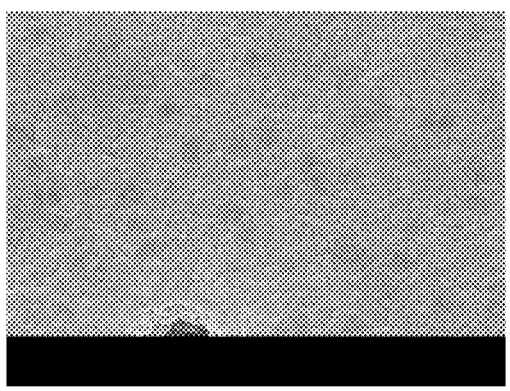
FIGS. 7A through 7D are SEM micrographs illustrating micro-structures of PTFE coating on embodiments of the disclosed nickel matrices varying, depending upon thermal treatment conditions after PTFE coating.
Figure 7B:
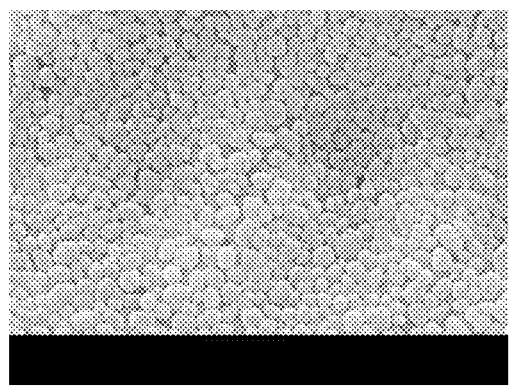
Figure 7C:
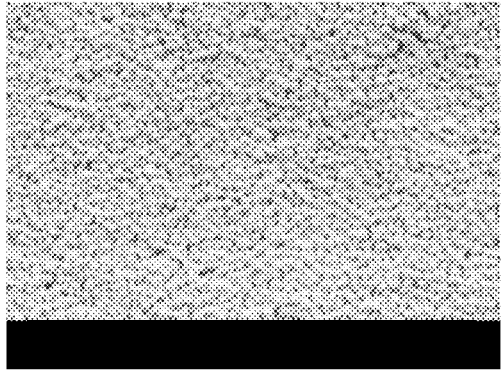
Figure 7D:
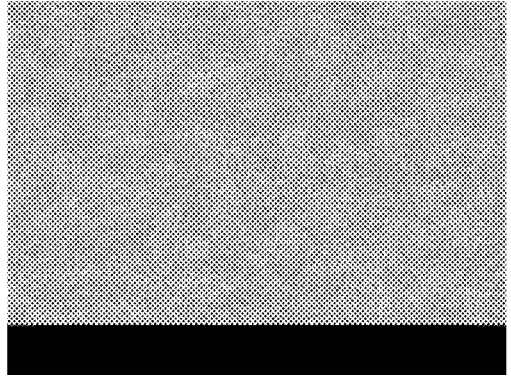
Figure 8A:
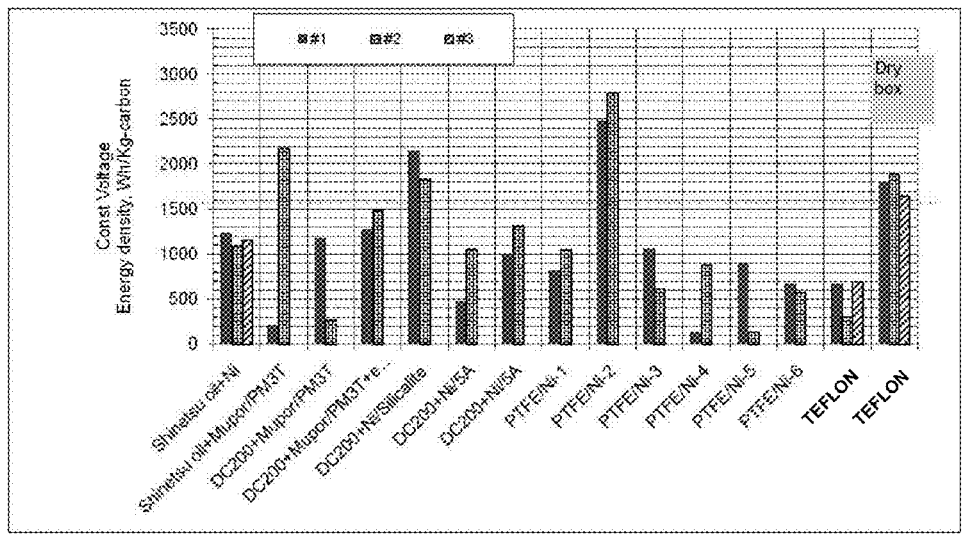
FIG. 8A is a bar graph illustrating that the energy density of a battery at a constant voltage is dependent upon the type of membrane barrier employed on a cathode in ambient air.
Figure 8B:
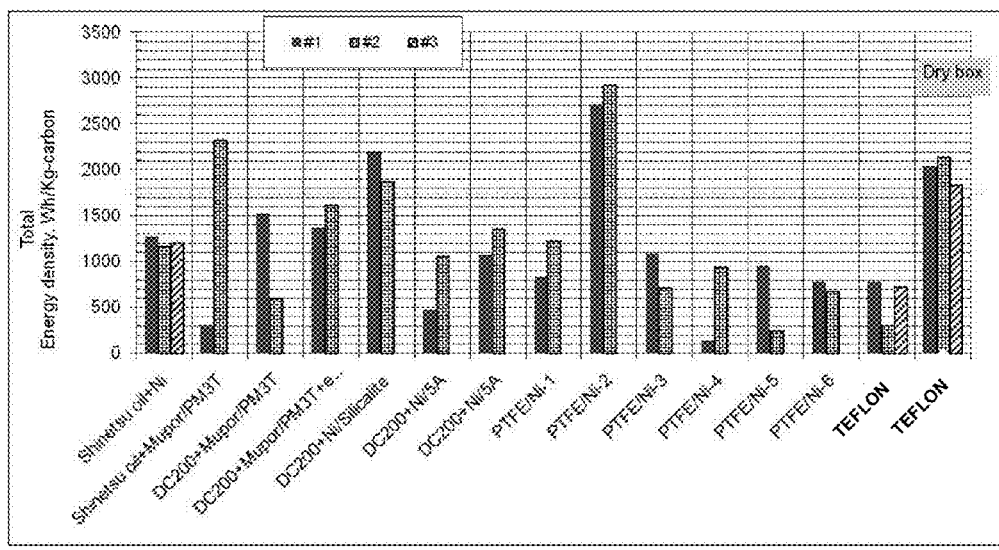
FIG. 8B is a bar graph illustrating that total energy density of a battery is dependent upon the type of membrane barrier utilized.

Table 1c lists six membrane samples prepared of different thickness and thermally treated under different conditions. The nickel matrix for these membranes was spun coated with DuPont™ PTFE TE-3859 fluoropolymer resin with 0.05 to 0.5 μm (PTFE) resin particles suspended in water. As shown by SEM analyses in FIGS. 7A-D, the membrane structure was dramatically affected by thermal treatment conditions after coating. One-hundred and thirty degree Celsius-treatment dried the membrane and left a porous coating layer as illustrated in FIG. 7A. Further heating to 300° C., caused agglomeration of the resin particles and increased the pore size of the coating layer (FIG. 7B). The PTFE suspension also contained approximately 6% (by weight of PTFE) of a non-ionic wetting agent and stabilizer. The wetting agent was removed by heating at 300° C., therefore, pore size of the coating increased. Such defects were mitigated by a second coating (FIG. 7C). Only by heating the coated sample to 360° C., which is above the melting point of PTFE polymer, was a dense film formed by quenching (FIG. 7D). This indicates the desirability of using a nickel matrix or a matrix that has the properties of a nickel matrix to make a dense, thin PTFE film, since polymeric matrix materials cannot withstand to such high temperatures.

TABLE 1c

Thin PTFE membrane coated on porous nickel matrix

| Sample name | Coating thickness, μm (# of coatings) | Heat treatment |
| --- | --- | --- |
| PTFE/Ni-1 | 12.3 (1) | 360° C., hot plate, 5 min |
| PTFE/Ni-2 | 12.6 (2) | 10° C./min, 360° C. 10 min, N2, Q |
| PTFE/Ni-3 | 19.2 (2) | 5° C./min, 130° C. 1 hr, 5° C./min |
| PTFE/Ni-4 | 14.0 (2) | 5° C./min, 320° C. 30 min, 1° C./min |
| PTFE/Ni-5 | 8.7 (1) | 10° C./min, 360° C. 10 min, N2, Q |
| PTFE/Ni-6 | 11.7 (1) | 10° C./min, 360° C. 10 min, N2, Q |

Membrane samples listed in Tables 1a-1c were packed in a battery coin-type cell with a 1.6 cm diameter with the same cathode material (a carbon black 1 mm air electrode) and tested under the same conditions (open air at room temperature, 20% relative humidity (RH)). The cathode specifications were: (1) KETJENBLACK, 1 mm air electrode from Dopp-Stein with originally laminated GORE PTFE membrane; (2) diameter×thickness=1.5875 cm×0.103 cm; and (3) surface area=2.0 $cm^2$. The carbon loading was 50 mg/$cm^2$ and the electrolyte was ELY-003 (1.0 M LiTFSI in PC/EC (1:1 wt); 200 μL. The commercial GOREPTFE membranes were tested both in open air together with other membranes and in the dry box as controls. Battery testing was conducted under ambient air conditions, in constant voltage and followed with constant current. The most power (less than 80%) was released during the constant voltage stage. The energy density correlated well with the battery discharge time.

Figure 9A:
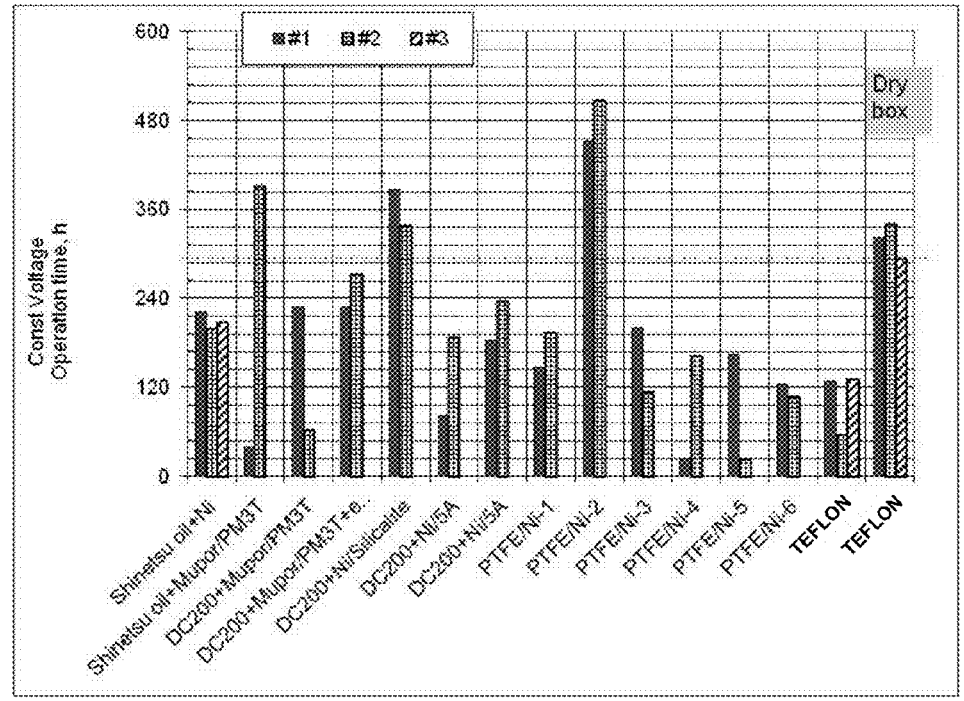
FIG. 9A is a bar graph illustrating that operational time (absent significant degradation) of a battery is dependent upon the type of membrane barrier.
Figure 9B:
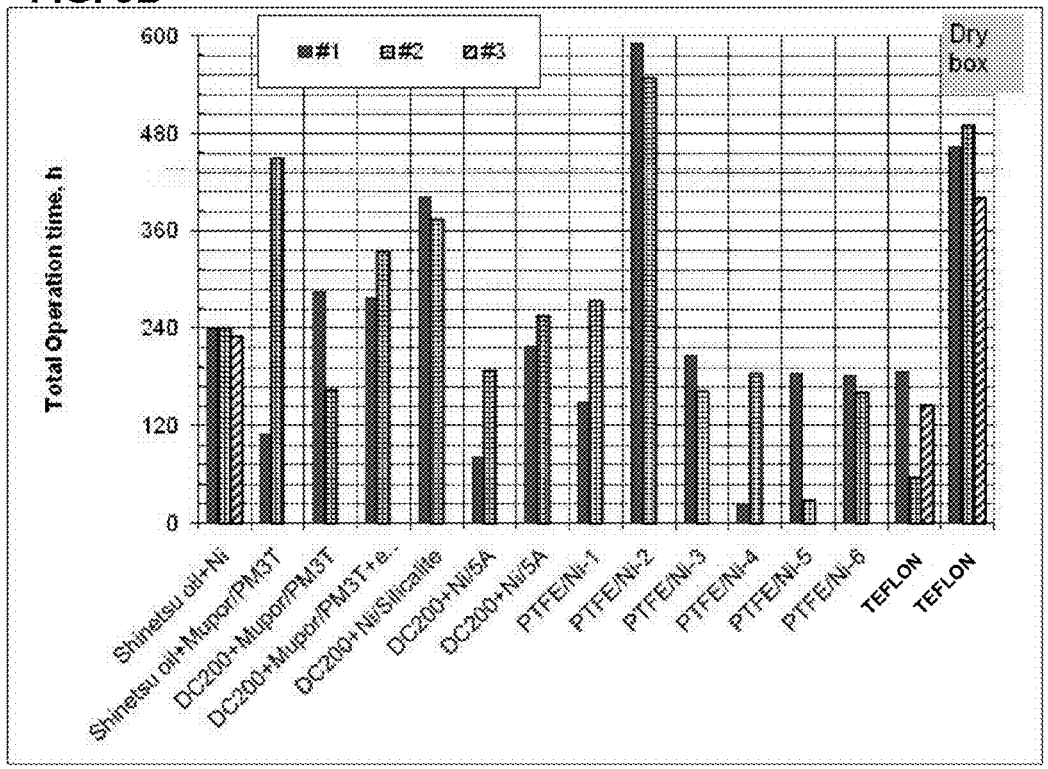
FIG. 9B is a bar graph illustrating that total operational time (absent significant degradation) of a battery is dependent upon the type of membrane barrier.

As illustrated in FIGS. 8A-9B, battery performance differed dramatically among the PTFE/nickel membranes depending upon the different conditions used to prepare each of the membranes. There were two or three parallel samples (bars) prepared for each condition. If samples prepared and tested at the same condition varied significantly, sample repeatability was low and not desirable. The battery including membrane sample PTFE/nickel-2 exhibited the best performance. The total energy density of this membrane in the ambient air reached 2800 Wh/Kg, which was substantially higher than that of the PTFE membrane operated in the dry box (approximately 1800 wh/Kg carbon) and dramatically higher than the PTFE membrane operated in the ambient air (approximately 700 wh/Kg carbon) (FIG. 8B). As illustrated in FIG. 9B, this membrane enabled 24 days of battery operation in the ambient air without detrimental degradation. The battery performance testing results are consistent with the membrane design ideas disclosed herein that a thin, dense hydrophobic membrane (nickel/PTFE) would be an effective barrier layer both to prevent the solvent from vaporization and to minimize moisture uptake from the ambient air. The other membranes prepared under conditions different from the sample PTFE/nickel-2 were less effective. This can be possibly explained by (i) the membranes were still porous under the treatment temperature below the polymer melting point and/or (ii) defects (cracks and/or pinholes) were present in the membrane prepared by one-time coating even after treatment above the melting point. Thus, two-time or multiple coatings and thermal treatment above the melting point of, for example, 360° C., are desirable conditions to make a dense, continuous thin PTFE membrane on the nickel matrix.

These results confirm that the disclosed, thin (<20 um), dense hydrophobic membrane (nickel/PTFE) is an effective barrier layer both to reject the moisture uptake and to prevent the solvent from vaporization.

Besides the PTFE/nickel-2 membrane, the oil-soaked nickel/silicalite membrane also showed high energy density (FIGS. 8A and 8B) and longer operation time (FIGS. 9A and 9B) than the control of the commercial PTFE membrane. The continuous silicalite zeolite membrane coating provided very tight pore structures (0.57 nm) so that the diffusion loss of the electrolyte solvent was hindered and the oil was more contained than the oil-soaked in the bare nickel matrix. The containment means that the oil diffusion into the electrolyte is hindered while the adhesion of the oil is enhanced.

Batch #2 Membranes

Figure 10A:
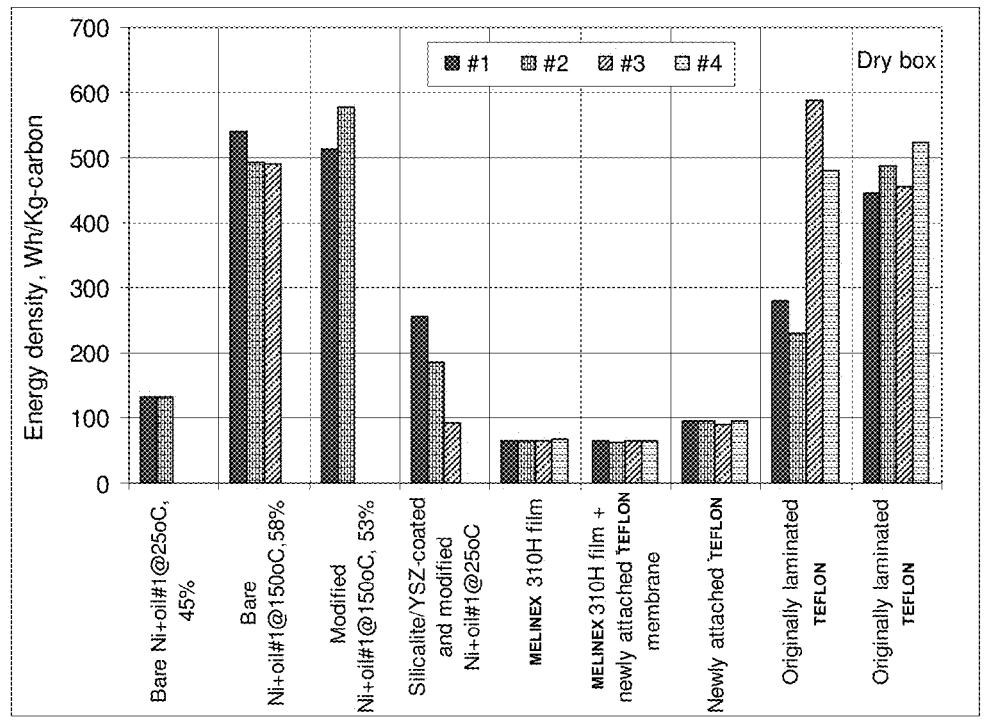
FIG. 10A is a bar graph illustrating that the energy density of a battery at a constant voltage is dependent upon the type of membrane barrier employed on a cathode in ambient air.
Figure 10B:
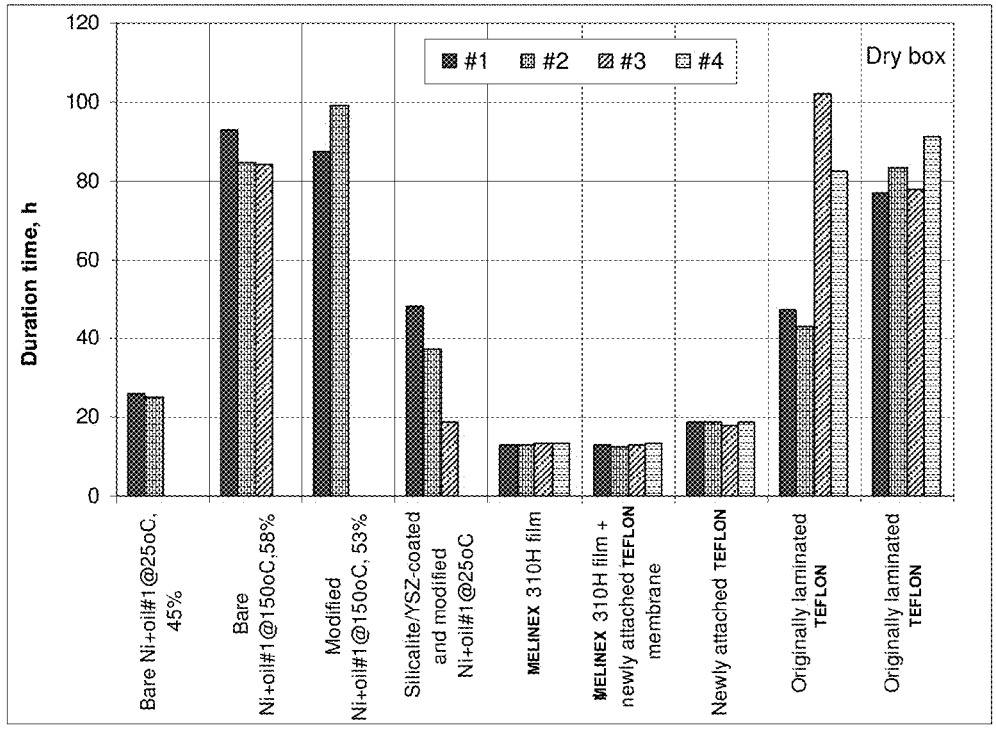
FIG. 10B is a bar graph illustrating that operational time (absent significant degradation) of a battery is dependent upon the type of membrane barrier.

Table 2 provides exemplary membranes. The percentage presented in the nickel+oil membranes is the percentage of volume of nickel pores that was occupied by the oil. The composition of oil #1 was DOW CORNING 200-fluid oil (viscosity of 100,00 cst). A bare nickel matrix is one that was prepared without any pretreatment whereas a modified nickel matrix is one that was pretreated with 5,000 cst silicone oil vapor as previously described. Membranes were evaluated in a coin-type cell battery No. 2325. FIGS. 10A and 10B provide the battery test results of membranes in Table 2 in ambient air. These studies demonstrated that the energy density of a battery at a constant voltage is dependent upon the type of membrane barrier employed on a cathode in ambient air (FIG. 10A) and that operational time of a battery is dependent upon the type of membrane barrier (FIG. 10B).

TABLE 2

Membranes evaluated in the second batch of battery tests

| Membrane name | Note |
|---|---|
| Bare Ni + oil#1 @25° C., 45% | Prepared in this work |
| Bare Ni + oil#1 @150° C., 58% | Prepared in this work |
| Modified Ni + oil#1 @ 150° C., 53% | Prepared in this work |
| Silicalite/YSZ-coated and modified Ni + oil#1 @25° C. | Prepared in this work |
| MELINEX 310H film | Commercially acquired |
| MELINEX 310H film + newly attached PTFE membrane | Commercially acquired |

TABLE 2-continued

Membranes evaluated in the second batch of battery tests

| Membrane name | Note |
|---|---|
| Newly attached PTFE | Commercially acquired |
| Originally laminated PTFE | Commercially acquired |
| Originally laminated PTFE | Commercially acquired |

Batch #3 Membranes

Table 3 provides membranes exemplary membranes. These silicalite membranes were grown on nickel matrix using hydrothermal crystal growth. One side of the nickel matrix was coated with a layer of YSZ particles (TZ-3YS, TOSOH Co.) and an additional layer of inter-grown zeolite (silicalite) crystals. YSZ (TZ-3YS, TOSOH Co.) with particles size of ~100 nm were screen-printed on the nickel matrix using a DEK 248 screen printer with 400 mesh screen. The silicalite layer was made by hydrothermally secondary growth method. At first, non-commercial silicalite seed crystals with size of ~100 nm were coated on the YSZ layer using a spin coater (WS-400B-6NPP-LITE, Laurell) at 1,500 rpm. Second, a crystal growth precursor was prepared by mixing 5.65 ml TPAOH (SIGMA-ALDRICH, St. Louis, Mo.), 10.2 ml TEOS (SIGMA-ALDRICH, St. Mo.) and 60 ml $H_2O$ at 50° C. for 2 hrs. The nickel substrate was mounted horizontally in the precursor in a 23 ml Parr acid digest bomb with its YSZ and silicalite crystal coated side facing downwards. The bomb was then sealed and heated at 180° C. for 2 hrs. The bomb was cooled down naturally in open air. The coated nickel substrate was taken out, rinsed with D.I. water and dried at 100° C. for 8 hrs. The PTFE/nickel membrane was prepared by laminating GORE PTFE membrane onto a fresh nickel surface with a hot roll laminator (Cheminstruments, Ohio) at 275° C. at various pressures. Membranes were tested in a coin-type cell battery (Battery No. 2325).

Figure 11A:
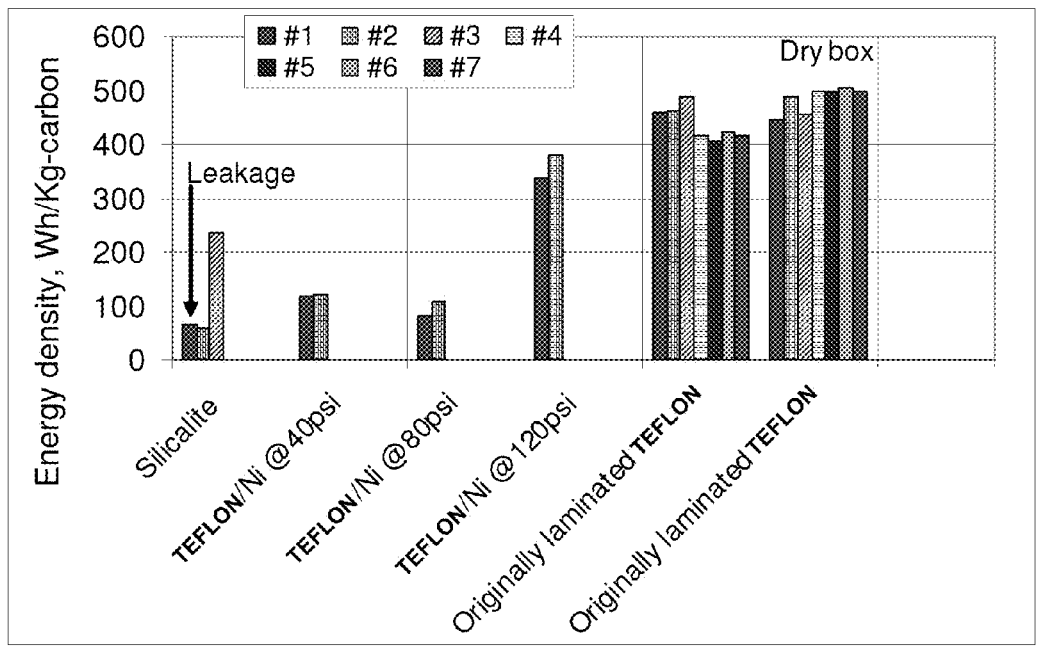
FIG. 11A is a bar graph illustrating that the energy density of a battery at a constant voltage is dependent upon the type of membrane barrier employed on a cathode in ambient air.
Figure 11B:
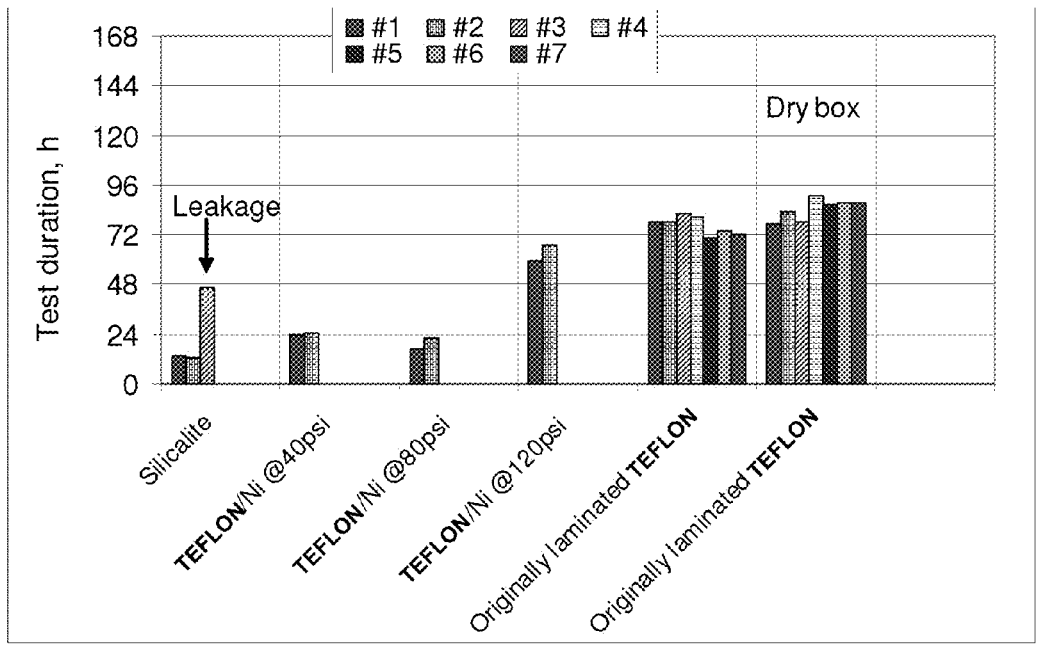
FIG. 11B is a bar graph illustrating that operational time (absent significant degradation) of a battery is dependent upon the type of membrane barrier.
Figure 12A:
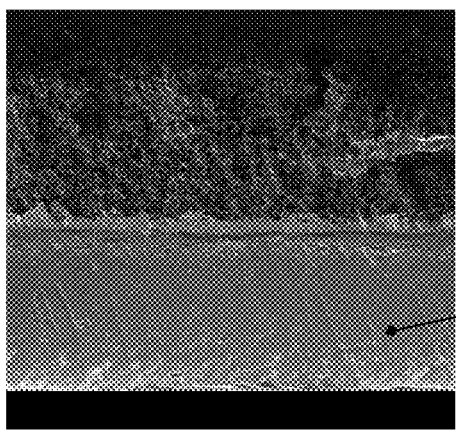
FIG. 12 is a pair of SEM images illustrating the texture of a PTFE membrane laminated on nickel sheet at 135° C. and 80 psi.
Figure 12B:
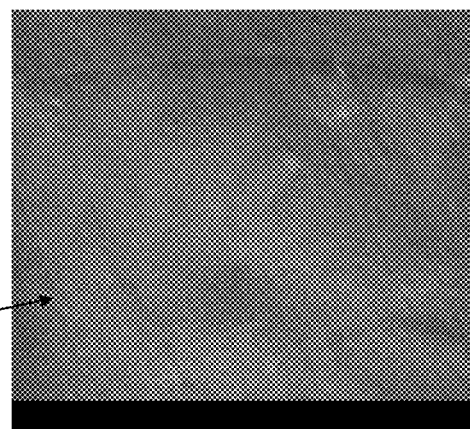

FIGS. 11A and 11B provide the battery test results of membranes in Table 3 in ambient air. FIG. 12 illustrates the texture of a PTFE membrane laminated on nickel sheet at 135° C. and 80 psi while FIG. 13 illustrates the texture of a silicalite membrane grown on nickel sheet. These studies demonstrated that the energy density of a battery at a constant voltage is dependent upon the type of membrane barrier employed on a cathode in ambient air (FIG. 11A) and that operational time of a battery is dependent upon the type of membrane barrier (FIG. 11B). For example, battery operation time of the PTFE membrane laminated on nickel increased with the lamination pressure. It is contemplated that poor performance of the silicalite/nickel membrane was likely due to leakage of the electrolyte solution in the assembly.

TABLE 3

Membranes evaluated in the third batch of battery tests

| Membrane name | Note |
|---|---|
| Silicalite | 1$^{st}$ silicalite membrane grown on nickel sheet |
| PTFE/Ni @40 psi | Commercial (GORE)PTFE membrane laminated on nickel |
| PTFE/Ni @80 psi | Commercial (GORE)PTFE membrane laminated on nickel |
| PTFE/Ni @120 psi | Commercial (GORE)PTFE membrane laminated on nickel |
| Originally laminated PTFE | Commercially acquired (GORE membrane) |
| Originally laminated PTFE | Commercially acquired (GORE membrane) |

Batch #4 Membranes

Figure 14A:
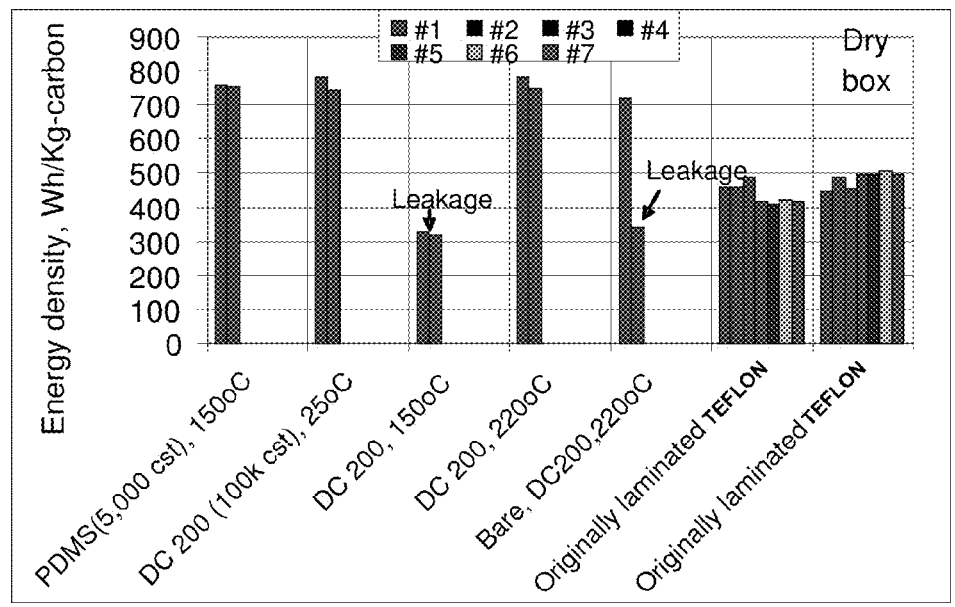
FIG. 14A is a bar graph illustrating that the energy density of a battery at a constant voltage is dependent upon the type of membrane barrier employed on a cathode in ambient air.
Figure 14B:
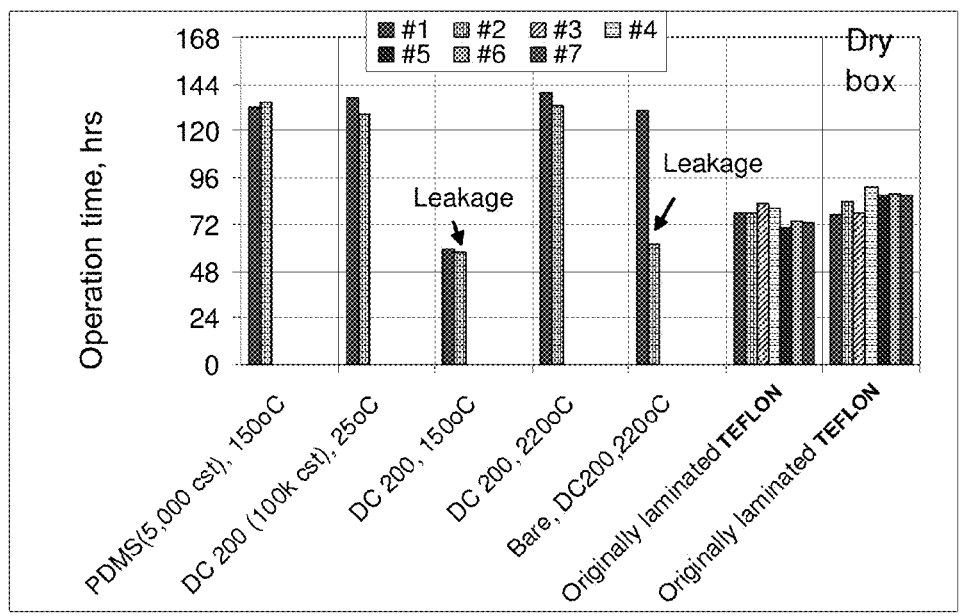
FIG. 14B is a bar graph illustrating that operational time (absent significant degradation) of a battery is dependent upon the type of membrane barrier.

Table 4 provides another set of exemplary membranes. To enhance the attachment of silicone oil in the nickel matrix pores, the matrix was pretreated to change its surface chemistry from hydrophilic to hydrophobic. The nickel substrate was located above DOW CORNING SYLGARD 184 silicone elastomer base (polydimethylsiloxane, PDMS, viscosity 5,000 cst) in a glass container covered with aluminum foil (not air-tight). The container was heated at 235° C. for various time periods and then cooled naturally in open air. During the heating, volatile short PDMS chains cross-linked on nickel surface and pores and resulted in a silicone coating. The present membranes were evaluated in a coin-type cell battery (Battery No. 2325). FIGS. 14A and 14B provide the battery test results of membranes in Table 4 in ambient air. Each bar in a given treatment represents a different sample prepared in the same manner.

These studies demonstrated that the energy density of a battery at a constant voltage is dependent upon the type of membrane barrier employed on a cathode in ambient air (FIG. 14A) and that operational time of a battery is dependent upon the type of membrane barrier (FIG. 14B). For example, all the oil+nickel membranes performed well if there was no detected leakage of the electrolyte solution in the assembly. For example, the oil+nickel membrane provided 134 hours of operation time in the air, compared to 76 hours for the commercial laminated PTFE membrane in the air, and 84 hours for the same PTFE membrane in a dry box without degradation. Further, oil itself was stable and immobilized, likely due to capillary forces and surface chemistry.

TABLE 4

Membranes evaluated in the fourth batch of battery tests

| Membrane name | Note |
|---|---|
| PDMS(5,0000 cst), 150° C. | Oil immobilized in porous nickel matrix pretreated |
| DC 200 (100k cst), 25° C. | Oil immobilized in porous nickel matrix pretreated |
| DC 200, 150° C. | Oil immobilized in porous nickel matrix pretreated |
| DC 200, 220° C. | Oil immobilized in porous nickel matrix pretreated |
| Bare, DC200, 220° C. | Oil immobilized in porous nickel matrix |
| Originally laminated PTFE | Commercially acquired (GORE membrane) |
| Originally laminated PTFE | Commercially acquired (GORE membrane) |

Membrane Separation Tests

Figure 15:
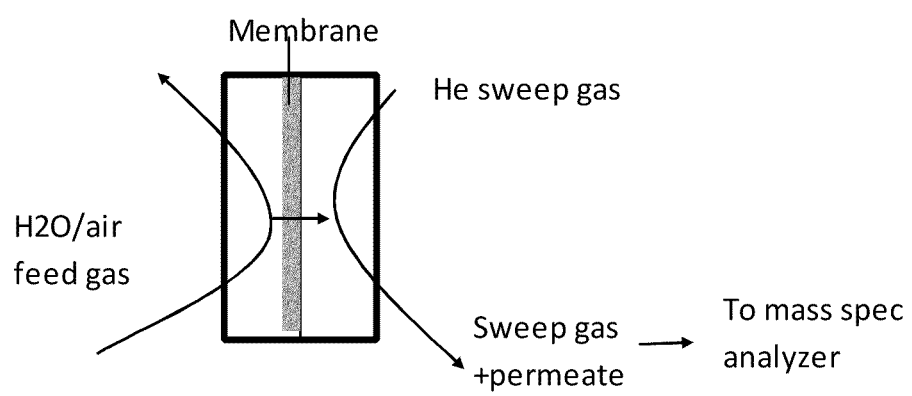
FIG. 15 is a schematic illustrating the process by which membrane permeability and selectivity with $H_2O$/Air was characterized.

The ability of the various disclosed membranes to separate different types of molecules were elevated by performing membrane separation tests as illustrated by FIG. 15. The membrane was mounted in a testing cell and tested at room temperature. Both feed and permeate side pressure was kept atmospheric. Permeation of $O_2$, $N_2$, and $H_2O$ was driven by their partial pressure differential on both sides. The $H_2O$ permeation was low and difficult to measure because its concentration level in the permeate side was in the same order of magnitude with the background $H_2O$ level.

Permeance was calculated with the following equation:

$$P_i = \frac{F_i}{SA_m \cdot \Delta P_i}$$

$F_i$=permeation flow rate of gas i, mol/s
$SA_m$=membrane surface area, m$^2$
$\Delta P_i$=partial pressure differential of gas i Selectivity factor was calculated with the following equation:

$$\alpha_{ij} = \frac{(y_i/y_j) \text{ permeate}}{(x_i/x_j) \text{ feed}}$$

$y_i$=molar fraction of gas i in permeate side
$x_i$=molar fraction of gas i in feed side Table 5 provides the permeation and selectivity factor for different oil+nickel membrane samples evaluated.

TABLE 5

Permeation and selectivity factor of different oil + nickel membrane samples (feed gas RH 40%, He sweep gas of 51.7 sccm, room temperature)

| Membrane # | Selectivity factor $O_2/H_2O$ | Selectivity factor $O_2/N_2$ | $O_2$ permeance, mol/m2/s/Pa |
|---|---|---|---|
| 92608-1-2 | 1.86 | 0.78 | 2.6E−07 |
| 111108-4-1 | 1.82 | 0.78 | 2.6E−07 |
| 111108-5-1 | 1.70 | 0.82 | 3.1E−07 |
| 111108-5-2 | 1.91 | 0.80 | 3.1E−07 |
| 111108-7-1 | 1.84 | 0.78 | 2.4E−07 |
| 111108-7-2 | 1.94 | 0.79 | 2.7E−07 |

Figure 16A:
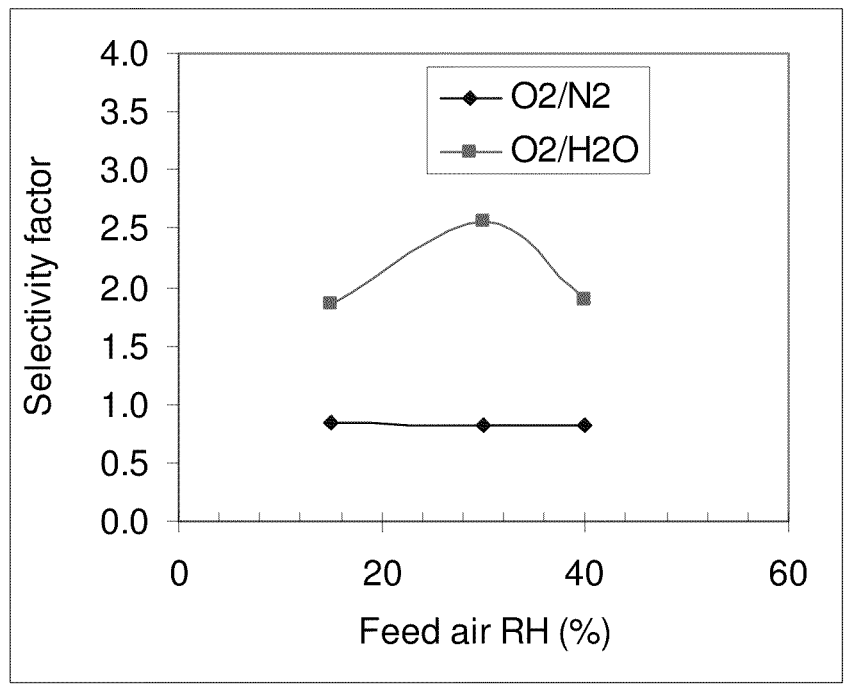
FIGS. 16A and 16B are graphs illustrating the variation of selectivity factor and permeation rate with relative humidity in feed air.
Figure 16B:
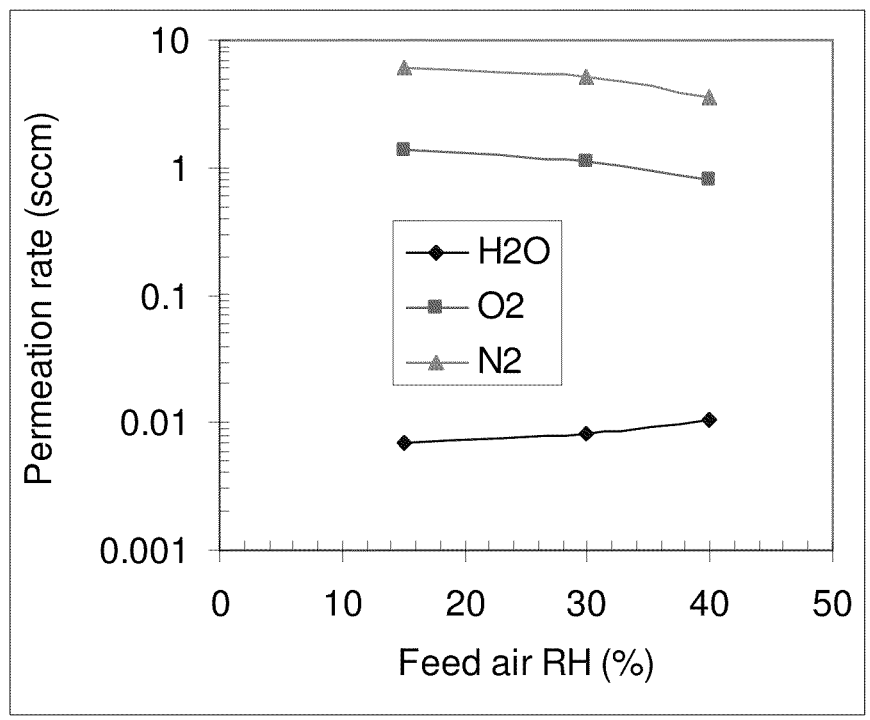
Figure 17A:
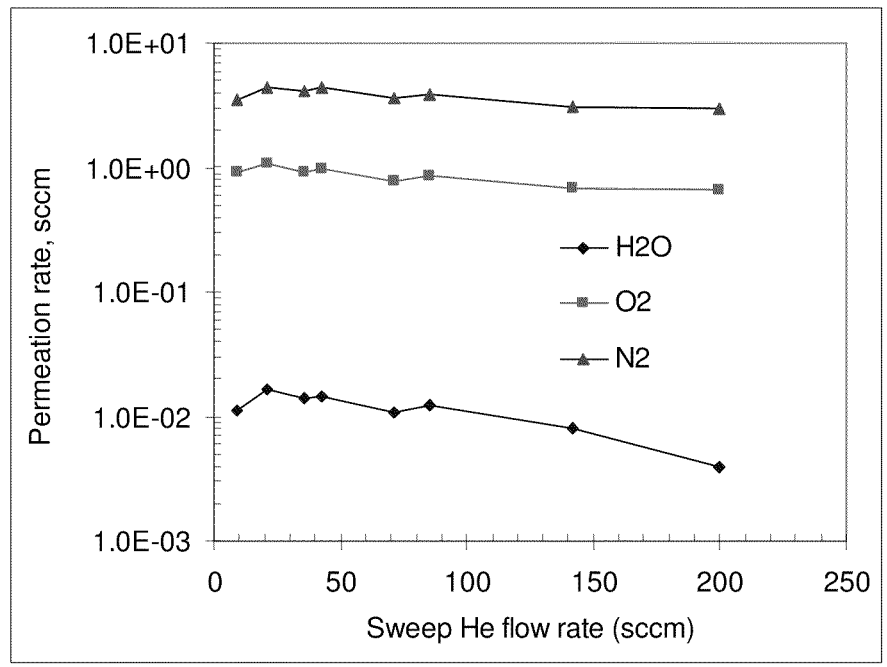
FIGS. 17A and 17B are graphs illustrating the variation of selectivity factor and permeation rate with He sweep gas flow rate.
Figure 17B:
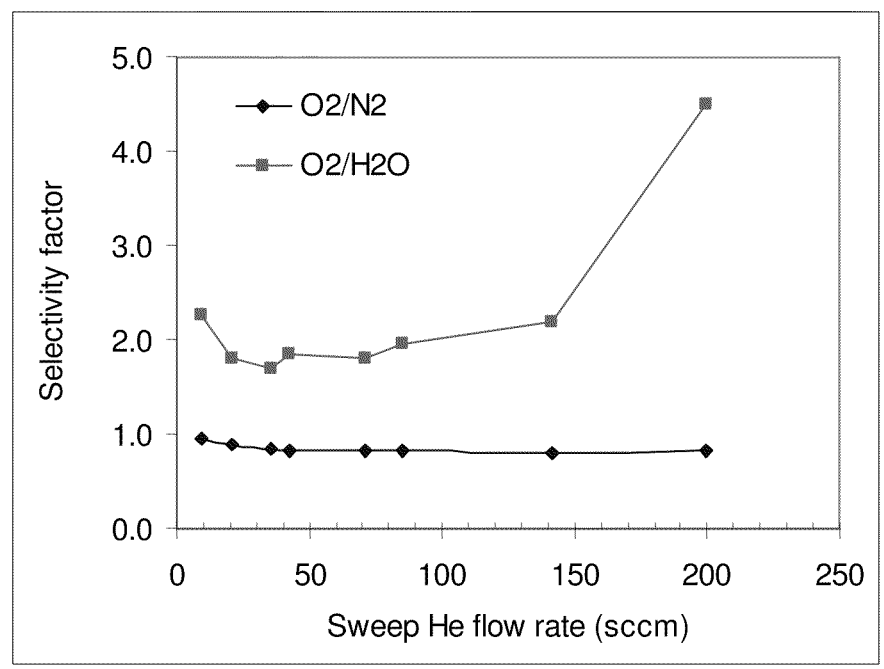
Figure 18:
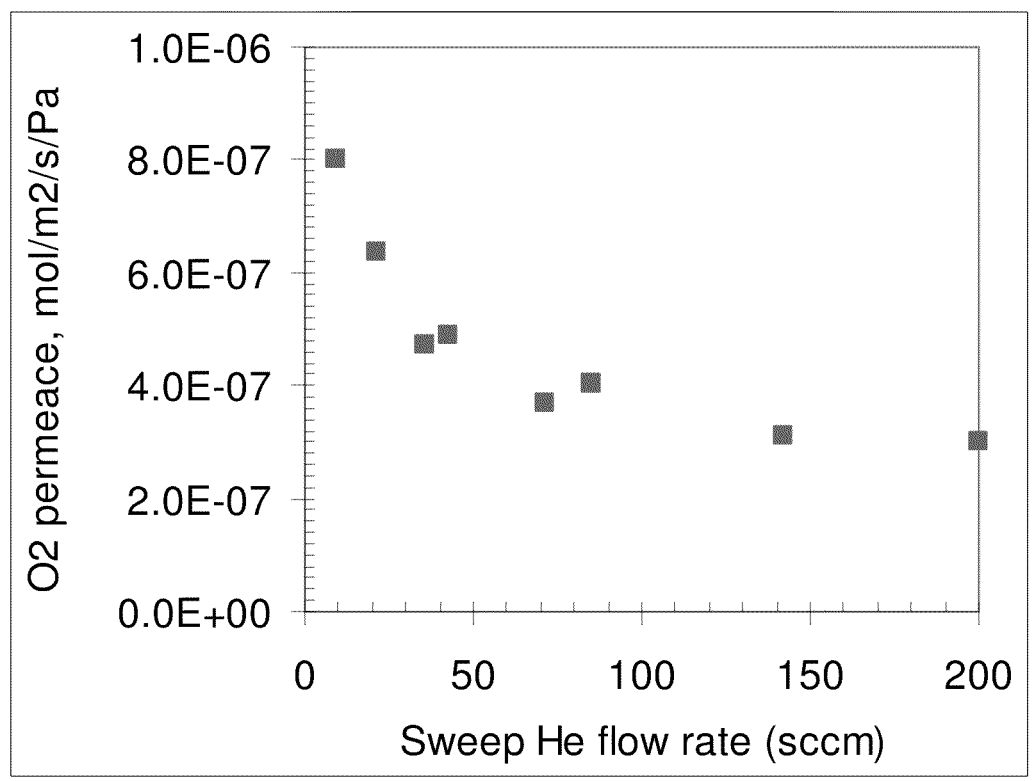
FIG. 18 is a graph demonstrating that the $O_2$ permeance of an embodiment of a disclosed immobilized membrane is $3.0$-$8.0 \times 10^{-7}$.

Variation of selectivity factor and permeation rate with relative humidity (RH) in feed air (membrane #111108-7-1, He sweep rate of 71.7 sccm) is illustrated in FIGS. 16A and 16B. FIGS. 17A and 17B illustrate the variation of selectivity factor and permeation rate with He sweep gas flow rate. Different He sweep gas flow rates were observed to correspond to different partial pressures on the permeate side. FIG. 18 demonstrates that the $O_2$ permeance of disclosed immobilized membrane #111108-7-1 is 3.0–8.0×10$^{-7}$ which is greater than the target $O_2$ permeance for 20 mA/cm2 current flux of 5.7×10$^{-8}$ or those taught by the prior art ($O_2$ permeance is about 3 orders of magnitude greater than those membranes disclosed in U.S. Pat. No. 5,985,475).

In summary, there is a positive correlation between the battery run length and the $O_2/H_2O$ selectivity factor measured from the gas-phase membrane separation tests. Thus, these studies demonstrate that the disclosed liquid immobilized membranes can function as an effective selective cathode barrier that can significantly increase lithium battery operation.

Example 4

Preparation of an Immobilized Liquid Membrane

This example provides methods for preparing an immobilized liquid membrane in which the liquid fluid is a silicone oil and membrane is a nickel matrix as described herein.

Figure 19:
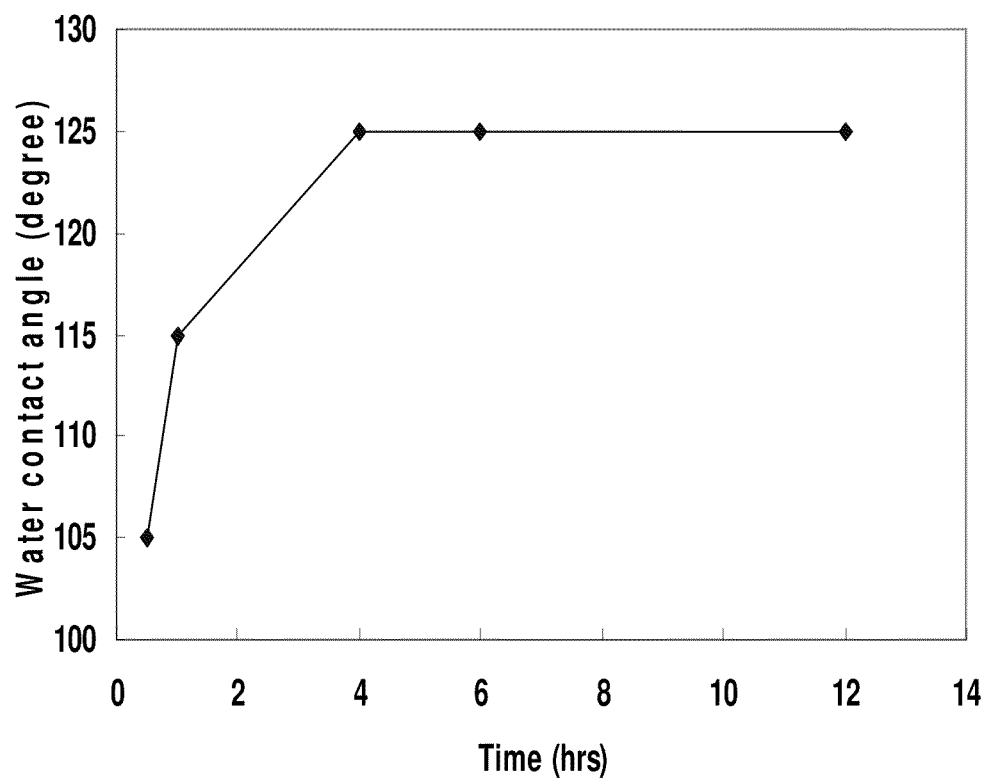
FIG. 19 is a graph illustrating that the water contact angle on an embodiment of the disclosed nickel matrix increases as the treatment time (at 235° C.) increases.

In order to improve the adhesion of the oil to the porous nickel matrix, the surface chemistry of such matrix was altered from being hydrophilic to hydrophobic. First, the nickel substrate was placed above DOW CORNING SYLGARD 184 silicone elastomer base (polydimethylsiloxane, PDMS, viscosity 5,000 cst) in a glass container covered with aluminum foil (not air-tight). The container was then heated at 235° C. for various times (a few hours to a 1 day) and then allowed to cool naturally in open air. During the heating, volatile short PDMS chains cross-linked on the nickel surface and pores and resulted in a silicone coating. As illustrated in FIG. 19, the water contact angle of the nickel matrix increased with the increase of treatment time. In particular, the nickel matrix surface became highly hydrophobic after 4 hours of treatment in which the water contact angle increased from 0° to 125±1°. No water penetration was observed through the membrane. Hydrophobicity of the PDMS-coated nickel matrix/substrate was stable after being kept in open air for 4 months.

Following pretreatment of the matrix, various immobilized liquid membranes were formed by loading silicone oils with various viscosities (e.g., 10,000 cst, 100,000 cst) into the surface-modified nickel substrate pores at different temperatures (25° C. to 220° C.) for various times (2 hrs to 6 hrs). In brief, 100 ml of silicone oil was placed into a 150 ml glass petri dish. The nickel matrix/substrate (5 cm×5 cm×50 μm in size) was dipped slowly into the oil until it was entirely submerged in a horizontal position in the oil. The petri dish was then vacuumed at −60 kPa in a vacuum oven at various temperatures for various times (2 to 6 hours). Bubbles were observed in the oil during vacuuming; however, at the end of vacuuming, no bubbles were observed. The nickel sheet was then carefully taken out from the oil at a 45° angle to the oil surface. Excessive oil was slowly wiped off from the nickel surface with a laboratory wipe resulting in a 30% to 66% (vol.) of nickel matrix pores occupied with silicone oil.

Example 5

Scale-Up of Membrane Samples for Battery Assembly of Larger Sizes

This example provides methods for scaling up the membrane processing for the disclosed immobilized membranes. A number of larger sized selective membranes were prepared for package tests of larger batteries. These membranes are provided below in Tables 6a-c. Oil-soaked nickel membrane samples (provided in Table 6a) were prepared by pretreating the porous nickel matrix with PDMS to become hydrophobic. Samples labeled with the same sample number except for the −1, −2, −3, −4 were parallel samples prepared by the same method. A water contact angle was approximately 125 degrees after the treatment versus zero degrees for the as-prepared nickel. Then, Dow Corning DC200 oil (SIGMA-ALDRICH Catalog No. 378437, St. Louis, Mo.) was soaked into the nickel pore at 220° C. The average membrane sample weight was 0.866 grams with standard deviation of 4%. Variation of oil weight gain was likely primarily due to the surface cleaning after the soaking, since the oil needed to fill the nickel pores was minimal (approximately 30 μl).

Oil-soaked Mupor PTFE membrane samples (as provided in Table 6b), were prepared by obtaining commercially available porous PTFE membrane sheets (Mupor Mupor PM6M PTFE membrane, 102 μm thickness, 1~2 μm pore size). The Shinatsu oil was then soaked into this matrix pore at 25° C. This porous polymeric sheet lacked sufficient mechanical integrity, was easily deformed and was difficult to handle during the membrane preparation process. The oil soaking could not be performed at high temperatures. The average membrane sample weight was 0.441 g with a standard deviation of 4%. It was lighter than the nickel membrane, although its thickness was doubled.

Dense PTFE coated nickel membrane samples (as provided in Table 6c) were prepared by coating one side of the nickel matrix with the PTFE resin/water solution (Dupont® 3859) two times followed with drying and thermal treatment. The thermal treatment at 350° C.-365° C. melted the resin particles into a dense film. The average sample weight was 0.806 g with standard deviation of 10%. The weight variation may be due to the matrix.

TABLE 6a

Oil-soaked nickel membrane samples (size, width × length × thickness = 50 mm × 50 mm × 50 μm)

| Sample # | Membrane weight, g | Oil weight gain (%) |
| --- | --- | --- |
| 21609-27-1 | 0.9011 | 10.6% |
| 21609-27-2 | 0.8815 | 18.3% |
| 21609-28-1 | 0.8829 | 2.2% |
| 21609-28-2 | 0.8711 | 2.1% |
| 21609-28-3 | 0.8007 | −4.6% |
| 21609-28-4 | 0.8581 | 4.9% |

TABLE 6b

Oil-soaked Mupor PTFE membrane samples (size, width × length × thickness = 46 mm × 46 mm × 120 μm)

| Sample # | Membrane weight, g | Oil weight gain (%) |
| --- | --- | --- |
| 21309-1 | 0.4296 | 17 |
| 21309-2 | 0.4487 | 23 |
| 21309-3 | 0.4606 | 24 |
| 21309-4 | 0.4241 | 15 |

TABLE 6C

Dense PTFE membrane coated on nickel matrix (size, width × length × thickness = 50 mm × 50 mm × 50 μm)

| Sample # | Weight, g | Coating thickness, um | Heat treatment |
| --- | --- | --- | --- |
| 14877-60-1 | 0.830 | 13 | 360 C. in air + 365 in N2, furnace |
| 14877-60-2 | 0.934 | 17 | 360 C. in air + 365 in N2, furnace |
| 14877-60-3 | 0.693 | 12 | 360 C. in air + 365 in N2, furnace |
| 14877-60-4 | 0.770 | 15 | hot plate, 350° C. |
| 14877-60-5 | 0.805 | 16 | hot plate, 350° C. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A selective membrane, comprising:
an immobilized liquid membrane consisting of,
a porous metallic host matrix sheet comprising a plurality of pores and a thickness of less than 200 microns; and
an immobilized liquid fluid comprising a silicone oil, the immobilized liquid fluid being immobilized and captured within the pores of the metallic host matrix and remaining inside the pores during use; wherein the immobilized liquid fluid within the porous metallic host matrix sheet allows selective permeation of oxygen over moisture.

2. The selective membrane of claim 1, wherein the the porous metallic host matrix sheet comprises nickel.

3. The selective membrane of claim 2, wherein the porous metallic host matrix sheet further comprises a nickel alloy, steel, stainless steel, titanium, aluminum, aluminum alloy or a combination thereof.

4. The selective membrane of claim 1, wherein the pores of the metallic host matrix sheet have an average pore size of less than 2 microns.

5. The selective membrane of claim 1, wherein the porous metallic host matrix sheet has a porosity of 25% to 75%.

6. The selective membrane of claim 1, wherein the porous metallic host matrix sheet has a thickness of less than 200 microns.

7. The selective membrane of claim 1, wherein the porous metallic host matrix sheet has a thickness of less than 100 microns.

8. The selective membrane of claim 1, wherein the porous metallic host matrix sheet has a thickness of less than 50 microns.

9. The selective membrane of claim 1, wherein the porous metallic host matrix sheet has a thickness of 30 microns.

10. The selective membrane of claim 1, wherein the selective membrane is capable of an $O_2$ permeance of greater than $10^{-10}$ mol/m²/s/Pa.

11. The selective membrane of claim 1, wherein the porous metallic host matrix sheet further comprises a thin film of gas-permeable coating having a thickness of less than 10 microns, the thin film coating formed on a surface of the porous metallic host matrix sheet and being capable of enhancing retention of the immobilized liquid fluid inside the plurality of pores within the porous metallic host matrix sheet.

12. The selective membrane of claim 11, wherein the thin film coating comprises hydrophobic zeolite, polytetrafluoroethylene, polydimethylsiloxane or mixtures thereof.

13. A selective membrane, comprising:
    an immobilized liquid membrane comprising,
        a porous metallic host matrix sheet of thickness of less than or equal to 100 microns having a plurality of pores and a porosity of from 25% to 75%, the pores having a size of less than or equal to 2 μm; and
        an immobilized liquid fluid immobilized and captured within the pores of the porous metallic host matrix sheet and remaining inside the pores during use;
    wherein the immobilized liquid within the porous metallic host matrix sheet allows selective permeation of a first type of molecule over a second type of molecule.

14. The selective membrane of claim 13, wherein the immobilized liquid fluid comprises a silicone oil.

15. The selective membrane of claim 13, wherein the first type of molecule is oxygen and the second type of molecule is water.

16. The selective membrane of claim 13, wherein the pores of the porous metallic host matrix sheet have a pore size of 2 microns.

17. The selective membrane of claim 13, wherein the porous metallic host matrix sheet has a thickness of less than or equal to 50 microns.

18. The selective membrane of claim 13, wherein the porous metallic host matrix sheet has a thickness of less than or equal to 30 microns.

19. The selective membrane of claim 13, wherein the selective membrane is capable of an $O_2$ permeance of greater than $10^{-10}$ mol/m²/s/Pa.

20. The selective membrane of claim 13, wherein the porous metallic host matrix sheet comprises nickel, a nickel alloy, steel, stainless steel, titanium, aluminum, aluminum alloy or a combination thereof.

21. The selective membrane of claim 13, wherein the porous metallic host matrix sheet comprises nickel.

22. The selective membrane of claim 13, further comprising a thin film of gas-permeable coating material less than or equal to 10 microns thick, the thin film coating formed on a surface of the porous metallic host matrix and capable of enhancing retention of the immobilized liquid fluid to the porous metallic host matrix during use.

23. The selective membrane of claim 22, wherein the thin film coating comprises polytetrafluoroethylene, polydimethylsiloxane or mixtures thereof.

24. A selective membrane, comprising:
    an immobilized liquid membrane consisting of,
        a porous metallic host matrix sheet comprising up to 90% pores and a thickness of less than or equal to 200 microns, the pores within the metallic host matrix sheet each having a size of less than or equal to 2 microns; and
        an immobilized liquid fluid immobilized and captured within the pores of the porous metallic host matrix sheet;
    wherein the metallic host matrix is capable of providing support to host gas-permeable separation or to host a catalytic coating; and the immobilized liquid is capable of selective permeation of a first type of molecule over a second type of molecule.

25. The selective membrane of claim 24, wherein the porous metallic host matrix sheet comprises nickel.

26. The selective membrane of claim 24, wherein the immobilized liquid fluid comprises a silicone oil.

27. The selective membrane of claim 26, wherein the immobilized liquid membrane is for separation of oxygen from water.

28. The selective membrane of claim 24, wherein the further comprises a thin film coating less than or equal to 10 microns thick, the thin film coating formed on the porous metallic host matrix sheet and being capable of enhancing retention of the immobilized liquid fluid inside the pores of the porous metallic host matrix sheet.

29. The selective membrane of claim 28, wherein the thin film coating comprises polytetrafluoroethylene, polydimethylsiloxane or mixtures thereof.

30. A device, comprising:
    a cathode;
    an immobilized liquid membrane coupled to the cathode, wherein the immobilized liquid membrane comprises a porous nickel host matrix with a pore size of less than 2 microns and immobilized silicone oil captured and held within each pore of the porous nickel host matrix, the immobilized liquid membrane forming a selective cathode barrier in the device and being capable of increasing durability of the device by at least 50% as compared to durability of the device without the immobilized liquid membrane.

31. The device of claim 30, wherein the porous metallic host matrix has a porosity of 25% to 75%.

32. The device of claim 30, wherein the porous metallic host matrix has a thickness of less than or equal to 50 microns.

33. A selective membrane, comprising:
    an immobilized liquid membrane consisting of,
        a porous, self-supported polytetrafluoroethylene (PTFE) host matrix sheet having a plurality of pores, the porous, self-supported PTFE host matrix sheet having an average pore size of less than or equal to 2 μm and a porosity of up to 85%; and
        an immobilized liquid fluid comprising silicone oil, the immobilized liquid fluid captured and held in the plurality of pores of the porous, self-supported PTFE host matrix sheet and remaining within the pores during use;
    wherein the immobilized liquid is capable of selective permeation of oxygen over moisture.

34. A selective membrane consisting of:
- a porous metallic host matrix having an average pore size of less than or equal to 2 μm, a porosity of from 25% to 75%, a thickness of less than or equal to 200 μm, and an exterior surface; and
- an immobilized layer of a selective membrane material on the exterior surface of the porous metallic host matrix, the immobilized layer of selective membrane material having a thickness of less than or equal to 10 μm; wherein the immobilized layer of selective membrane material is capable of selective permeation of a first type of molecule over a second type of molecule.

35. The selective membrane of claim 34, wherein the selective membrane material comprises polyflurohydrocarbon and wherein the first type of molecule is oxygen and the second type of molecule is water.

36. The selective membrane of claim 34, wherein the selective membrane material comprises polytetrafluoroethylene (PTFE) and wherein the first type of molecule is oxygen and the second type of molecule is water.

37. A method comprising oxygen permeation in a battery device by use of a selective membrane of claim 1.

38. A method comprising oxygen permeation in a battery device by use of a selective membrane of claim 12.

39. A method comprising oxygen permeation in a battery device by use of a selective membrane of claim 24.

* * * * *